(12) United States Patent
Asatsuke et al.

(10) Patent No.: US 6,364,801 B1
(45) Date of Patent: Apr. 2, 2002

(54) AUTOMATIC TRANSMISSION CONTROL SYSTEM

(75) Inventors: Shoji Asatsuke; Tatsuyuki Ohashi; Hideki Wakamatsu; Takayuki Yamaguchi; Tomonari Shirai, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/589,224

(22) Filed: Jun. 8, 2000

(30) Foreign Application Priority Data

Jun. 10, 1999 (JP) ............................................. 11-163364

(51) Int. Cl.$^7$ ............................................. F16H 61/18
(52) U.S. Cl. ........................ 475/119; 475/120; 475/133; 74/336 R; 477/126
(58) Field of Search ................................. 475/119, 120, 475/121, 132, 133, 134; 477/126; 74/336 R

(56) References Cited

U.S. PATENT DOCUMENTS 4,726,262 A * 2/1988 Hayakawa et al. ..... 475/119 X
5,334,114 A * 8/1994 Ando et al. ................. 475/119
5,437,204 A * 8/1995 Person .................... 475/133 X
5,643,123 A * 7/1997 Jang et al. ................... 475/119

FOREIGN PATENT DOCUMENTS

| GB | 2109879 | * | 6/1983 |
| JP | 05-209683 | | 8/1993 |
| JP | 05-215228 | | 8/1993 |
| JP | 05-223156 | | 8/1993 |

* cited by examiner

*Primary Examiner*—Charles A. Marmor
*Assistant Examiner*—Ha Ho
(74) *Attorney, Agent, or Firm*—Arent Fox Kintner Plotkin & Kahn, PLLC

(57) ABSTRACT

A control system for an automatic transmission comprises a forward/reverse selection hydraulic servomechanism 70, a D inhibitor valve, which controls the supply of a line pressure to the servo-oil chambers of this servomechanism, and a plurality of solenoid valves 81~85, which are used for controlling the actuation of the shift valves and the D inhibitor valve. This control system comprises a first neutral mode and a second neutral mode for a neutral range. In the first neutral mode, the D inhibitor valve is switched to a forward drive position, and the forward drive servo-oil chamber is connected to a drain. In the second neutral mode, the D inhibitor valve is switched to a reverse drive position, and the forward drive and reverse drive servo-oil chambers are both connected to the drain.

8 Claims, 18 Drawing Sheets

AUTOMATIC TRANSMISSION CONTROL SYSTEM

RELATED APPLICATIONS

This application claims the priority of Japanese Patent Applications No.11-163364 filed on Jun. 10, 1999 filed which is incorporated here in by reference.

FIELD OF THE INVENTION

The present invention relates to an automatic transmission which comprises a power transmission mechanism incorporating a plurality of power transmission paths and a plurality of hydraulically operated frictionally engaging means. These hydraulically operated frictionally engaging means are controlled to select these power transmission paths individually, by means of hydraulic oil which is supplied through a plurality of shift control valves.

BACKGROUND OF THE INVENTION

Such automatic transmissions have been known and are utilized, for example, as automatic transmissions for vehicles. Typically, an automatic transmission designed for use in a vehicle operates such that the transmission automatically controls the actuation of hydraulic clutches to change the speed change ratio in correspondence to the driving condition of the vehicle. Generally, the automatic transmission includes a speed change hydraulic unit which comprises a plurality of shift control valves, a solenoid valve to control the actuation of these shift control valves, and a manual valve operated in correspondence to the movement of the shift lever manipulated by a driver. In this arrangement, the automatic transmission automatically performs speed change control for a plurality of ranges, i.e., a reverse drive range, a neutral range and a forward drive range (D range, Second, First, etc.) which are individually selected by the operation of the manual valve operated in correspondence to the manipulation of the shift lever (generally, this automatic control is effective only in the forward drive range).

Recently, another type of automatic transmission has been introduced. This automatic transmission does not use a manual valve for the selection of a range and controls the shift of speed ratios in each range solely by electrical signals. Such transmissions are disclosed in Japanese Laid-Open Patent Publication Nos. H5 (1993)-209683 and H5 (1993)-215228. Each automatic transmission disclosed there comprises a plurality of solenoid valves to control the actuation of shift control valves. The selection of the ranges, i.e., the forward drive range, the neutral range, and the reverse drive range, as well as the selection of the speed ratios in the forward drive range are performed in correspondence to the command signals (electrical signals) which actuate these solenoid valves.

As such a system controls the selection of drive ranges and speed ratios solely by the hydraulic pressure, there is a concern that the drive range selection may be performed inaccurately when a solenoid valve breaks down or malfunctions. To improve the performance of the system, Japanese Laid-Open Patent Publication No. H5 (1993)-223156 discloses a system which comprises oil pressure sensors and range determining means. These oil pressure sensors detect the hydraulic pressure generated for establishing the drive ranges, and the range determining means determines, from the actuation signals of the solenoid valves, in which drive range the transmission is set currently. In this construction, the system compares the drive range determined by the range determining means with the drive range actually set, the latter being detected by the oil pressure sensors, to judge whether the transmission is controlled correctly. If an abnormality is detected, then the system uses extra valves through which the hydraulic pressure is supplied to a plurality of oil passages for the control of the transmission.

This system requires a number of oil pressure sensors, each sensor for detecting the hydraulic pressure generated for establishing a corresponding drive range. If one of these sensors breaks down, then the detection of the drive range may be affected, so the detection of malfunctions will become unreliable. Moreover, because the system needs to establish a plurality of oil passages when a breakdown is detected, the hydraulic circuit of the system is complex, which often results in an increased production cost.

SUMMARY OF THE INVENTION

It is an object of the present invention to provide a control system for an automatic transmission, which system is relatively simple in construction and is capable of performing appropriate speed change control in response to a manipulation of drive range switching even in an event where some elements experience failures.

To achieve this objective, the present invention provides a control system for an automatic transmission comprising a power transmission mechanism (for example, the parallel shaft speed change mechanism TM of the embodiment described in the following section), a plurality of hydraulically operated frictionally engaging means (for example, the LOW clutch 11, the SECOND speed clutch 12, the THIRD speed clutch 13, the FOURTH speed clutch 14 and the FIFTH speed clutch 15 of the following embodiment), a plurality of shift control valves (for example, the first shift valve 60 or 260, the second shift valve 62 or 262, the third shift valve 64 or 264, the fourth shift valve 66 or 266, the fifth shift valve 68 or 268 and the CPB valve 56 of the following embodiment), a forward/reverse hydraulic servo-mechanism (for example, the forward/reverse selection hydraulic servomechanism 70 of the following embodiment), a D inhibitor valve and a plurality of solenoid valves (for example, the first~fifth on/off solenoid valves 81~85 and the first~fourth on/off solenoid valves 281~284 of the following embodiments). The power transmission mechanism incorporates a plurality of power transmission paths, and the hydraulically operated frictionally engaging means are provided inside the power transmission mechanism and are used for selecting the power transmission paths individually. The shift control valves are used for controlling the supply of hydraulic oil to the hydraulically operated frictionally engaging means, and the forward/reverse hydraulic servomechanism is used for switching and selecting either the power transmission paths assigned for a forward drive range or the power transmission paths assigned for a reverse drive range. The D inhibitor valve is switched for controlling the supply of a line pressure into the forward drive and reverse drive servo-oil chambers of the forward/reverse hydraulic servomechanism, and the plurality of solenoid valves are used for controlling the actuation of the shift control valves and the D inhibitor valve. Specifically, the D inhibitor valve is switchable between a forward drive position which connects the reverse drive servo-oil chamber to a drain and a reverse drive position which allows the line pressure into the reverse drive servo-oil chamber. Furthermore, the control system comprises a first neutral mode and a second neutral mode as neutral modes to be set when a manipulation is made to shift the transmission to a neutral range. In the first neutral mode, the D inhibitor valve is switched to the forward drive position, and the forward drive servo-oil chamber is connected to the drain through one of the shift control valves. In the second neutral mode, the D inhibitor valve is switched to the reverse drive position, and the forward drive and reverse drive servo-oil chambers are connected to the drain through one of the shift control valves.

In the first neutral mode, because the D inhibitor valve is positioned at the forward drive position, and the reverse drive servo-chamber is drained, there is no possibility that the forward/reverse hydraulic servomechanism be accidentally switched to an R range position to select the power transmission path assigned for the reverse drive range in an event that a shift control valve malfunctions. In a similar way, in the second neutral mode, because the D inhibitor valve is positioned at the reverse drive position, there is no possibility that the forward/reverse hydraulic servomechanism be accidentally switched to the D range position to select the power transmission paths assigned for the forward drive range in an event that a solenoid valve or a shift control valve malfunctions. The control system sets the first or second neutral mode appropriately for the neutral range in correspondence to a type of shift manipulation performed by the driver. In an event that a shift control valve or a solenoid valve malfunctions, the system fixes the forward/reverse hydraulic servomechanism at either the D range position or the R range position and thereby prevents the forward/reverse hydraulic servomechanism from being switched accidentally.

For example, when a manipulation is made to shift the transmission from the forward drive range through the neutral range to the reverse drive range, the control system sets the second neutral mode to switch the D inhibitor valve to the reverse drive position and then, keeping the D inhibitor valve at the reverse drive position, sets a reverse mode in which the line pressure is supplied into the reverse drive servo-chamber through one of the shift control valves. In this way, for example, if there is a breakdown in the control of the D inhibitor valve, the system can retain the forward/reverse hydraulic servomechanism as is and prevents it from being switched accidentally.

In this case, it is preferable that the solenoid valve having been used for switching the D inhibitor valve to the reverse drive position for setting the second neutral mode be turned on or off into an opposite state to supply the line pressure into the reverse drive servo-oil chamber for setting the reverse drive mode. If this solenoid valve experiences a breakdown, then the D inhibitor valve or the forward/reverse hydraulic servomechanism can be fixed to prevent the forward/reverse hydraulic servomechanism from being switched accidentally.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by way of illustration only and thus are not limitative of the present invention.

DESCRIPTION OF THE PREFERRED EMBODIMENTS

FIGS. 1 through 4 show an automatic transmission which incorporates a first embodiment of control system according to the present invention. In a transmission housing HSG, this transmission comprises a torque converter TC, which is connected to the output shaft of an engine (not shown), a parallel shaft speed change mechanism TM, which is connected to the output member (or turbine) of the torque converter TC, and a differential mechanism DF including a last reduction driven gear 6b, which meshes with a last reduction drive gear 6a provided in the speed change mechanism TM. The drive power for the vehicle is transmitted through the differential mechanism DF to lateral wheels.

Figure 4:
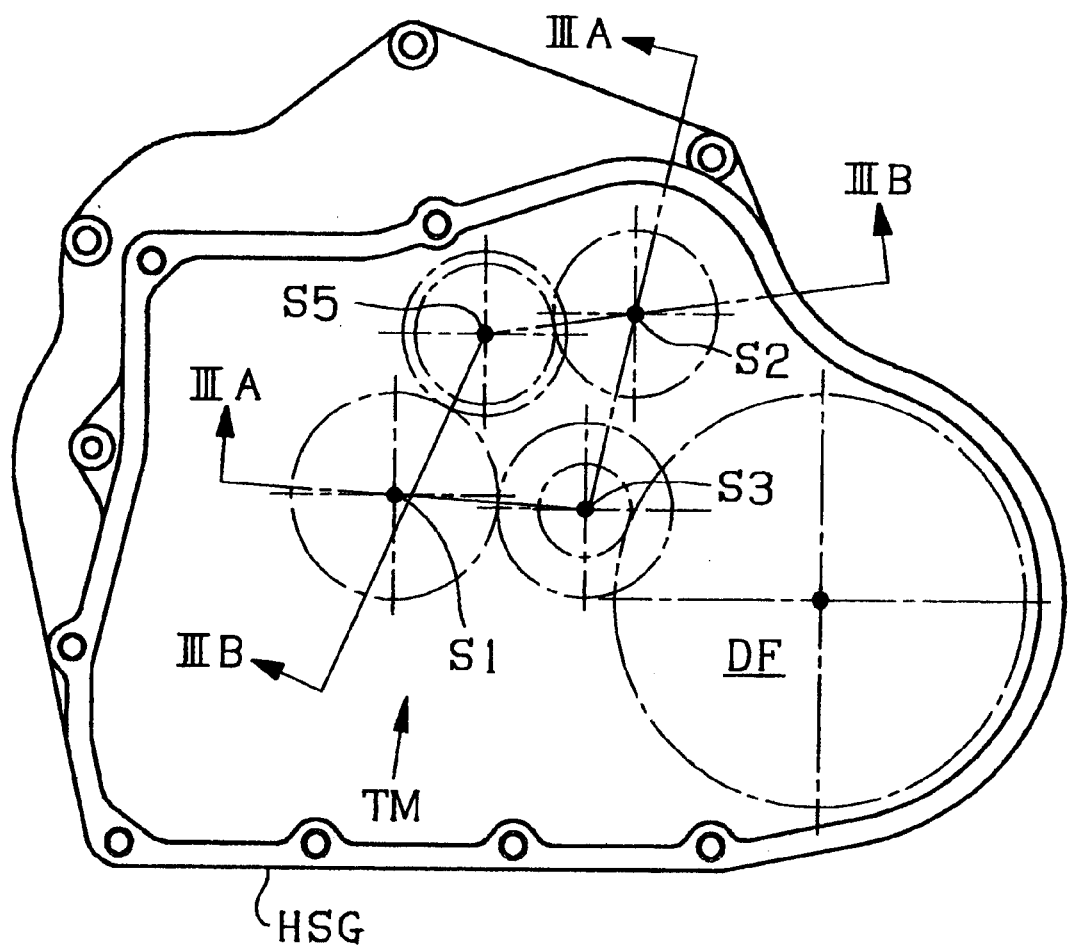
FIG. 4 is a schematic diagram showing the relative positions of the shafts of the automatic transmission.

The parallel shaft speed change mechanism TM includes a first input shaft 1, a second input shaft 2, a countershaft 3, and an idle shaft 5, all of which are disposed parallel with one another. FIG. 4 shows the positions of these shafts in the housing, the centers of the shafts being indicated by corresponding alphanumeric marks, S1, S2, S3 and S5. FIGS. 3A and 3B show the rotational components of the speed change mechanism TM, which are arranged for mechanical power transmission. FIG. 3A is a schematic sectional view showing the first input shaft 1 (S1), the second input shaft 2 (S2) and the countershaft 3 (S3), which are taken along line IIIA-IIIA in FIG. 4, while FIG. 3B is a schematic sectional view showing the first input shaft 1 (S1), the second input shaft 2 (S2) and the idle shaft 5 (S5), which are taken along line IIIB—IIIB in FIG. 4. Furthermore, FIG. 1 corresponds with FIG. 3A while FIG. 2 corresponds with FIG. 3B, all of which are sectional views of the speed change mechanism TM.

The first input shaft 1 is connected directly to the turbine of the torque converter TC and is supported rotatably by bearings 41a and 41b. The first input shaft 1 receives the drive power from the turbine and rotates with it at the same rotational speed. On this input shaft 1, from the side of the torque converter TC (i.e., the right side of the drawing), disposed are a FIFTH speed drive gear 25a, a FIFTH speed clutch 15, a FOURTH speed clutch 14, a FOURTH speed drive gear 24a, a reverse drive gear 26a, and a first connection gear 31. The FIFTH speed drive gear 25a is disposed rotatably on the first input shaft 1, and the FIFTH speed clutch 15, which is actuated hydraulically, engages with the FIFTH speed drive gear 25a to connect it rotationally to the first input shaft 1. The FOURTH speed drive gear 24a and the reverse drive gear 26a, which are coupled as one body, are disposed rotatably on the first input shaft 1, and the FOURTH speed clutch 14, which is actuated hydraulically, engages with these gears to connect them rotationally to the first input shaft 1. The first connection gear 31 is mounted on the first input shaft 1, at the left end thereof outside the bearing 41a, which supports the first input shaft 1 rotatably. In this condition, the first connection gear 31 and this end portion of the first input shaft 1 are supported only by this bearing 41a in cantilever.

The second input shaft 2 is also supported rotatably by bearings 42a and 42b. On this input shaft 2, from the right side of the drawing, disposed are a SECOND speed clutch 12, a SECOND speed drive gear 22a, a LOW drive gear 21a, a LOW clutch 11, a THIRD speed clutch 13, a THIRD speed drive gear 23a, and a fourth connection gear 34. The SECOND speed drive gear 22a, the LOW drive gear 21a and the THIRD speed drive gear 23a are each disposed rotatably on the second input shaft 2, and the SECOND speed clutch 12, the LOW clutch 11, or the THIRD speed clutch 13, which is actuated hydraulically, engages with the respective gear to connect it rotationally to the second input shaft 2. In addition, the fourth connection gear 34 is coupled to the second input shaft 2.

The idle shaft 5 including a second connection gear 32 and a third connection gear 33, which are formed as one body with the idle shaft 5, is supported rotatably by bearings 45a and 45b. The second connection gear 32 meshes with the first connection gear 31 while the third connection gear 33 meshes with the fourth connection gear 34. The first, second, third and fourth connection gears constitute a connection gear train 30, through which the rotation of the first input shaft 1 is transmitted continually to the second input shaft 2.

The countershaft 3 is supported rotatably by bearings 43a and 43b. On this shaft 3, from the right side of the drawing, disposed are the above mentioned last reduction drive gear 6a, a SECOND speed driven gear 22b, a LOW driven gear 21b, a FIFTH speed driven gear 25b, a THIRD speed driven gear 23b, a FOURTH speed driven gear 24b, a dog clutch 16, and a reverse driven gear 26c. The last reduction drive gear 6a, the SECOND speed driven gear 22b, the LOW driven gear 21b, the FIFTH speed driven gear 25b and the THIRD speed driven gear 23b are fixed on and rotate together with the countershaft 3 while the FOURTH speed driven gear 24b and the reverse driven gear 26c are each disposed rotatably on the countershaft 3. The dog clutch 16 is actuated axially in one direction to engage with the FOURTH speed driven gear 24b so as to connect it rotationally to the countershaft 3 or in the opposite direction to engage with the reverse driven gear 26c so as to connect it rotationally to the countershaft 3.

As shown in the drawings, the LOW drive gear 21a meshes with the LOW driven gear 21b; the SECOND speed drive gear 22a meshes with the SECOND speed driven gear 22b; the THIRD speed drive gear 23a meshes with the THIRD speed driven gear 23b; the FOURTH speed drive gear 24a meshes with the FOURTH speed driven gear 24b; and the FIFTH speed drive gear 25a meshes with the FIFTH speed driven gear 25b. In addition, the reverse drive gear 26a meshes with a reverse idler gear 26b (refer to FIG. 2), which then meshes with the reverse driven gear 26c.

Figure 1:
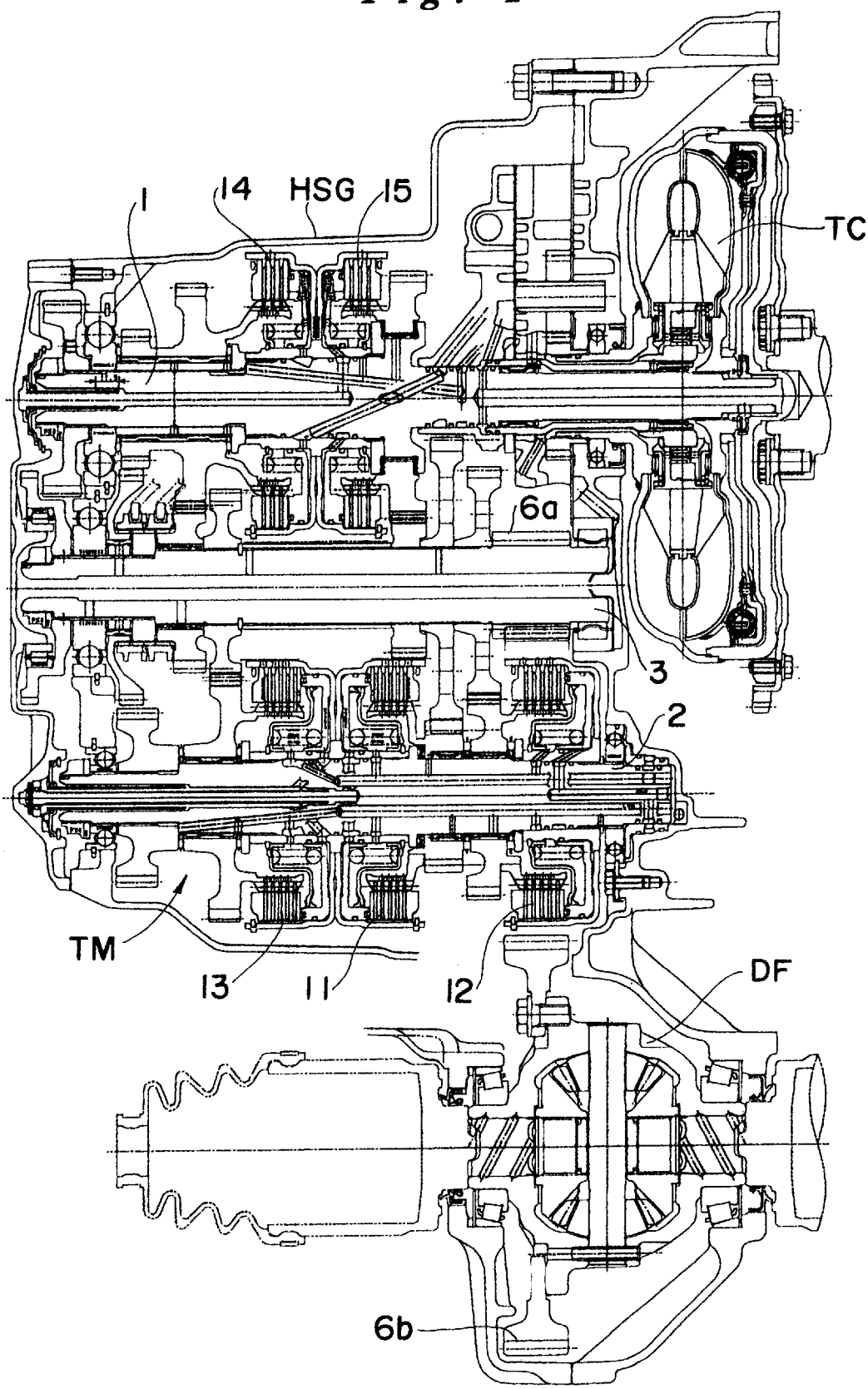
FIG. 1 is a sectional view of an automatic transmission whose speed change is controlled by a control system according to the present invention.
Figure 2:
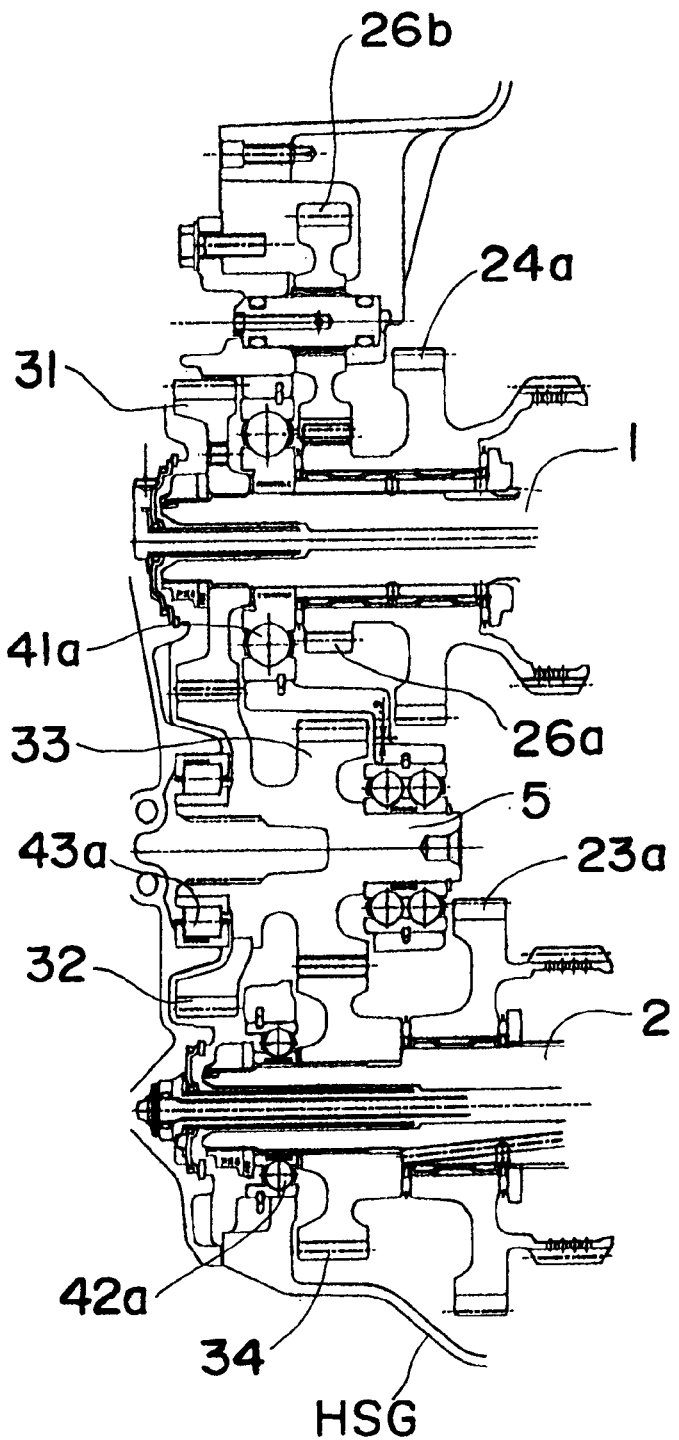
FIG. 2 is a partial sectional view of the automatic transmission.
Figure 3:
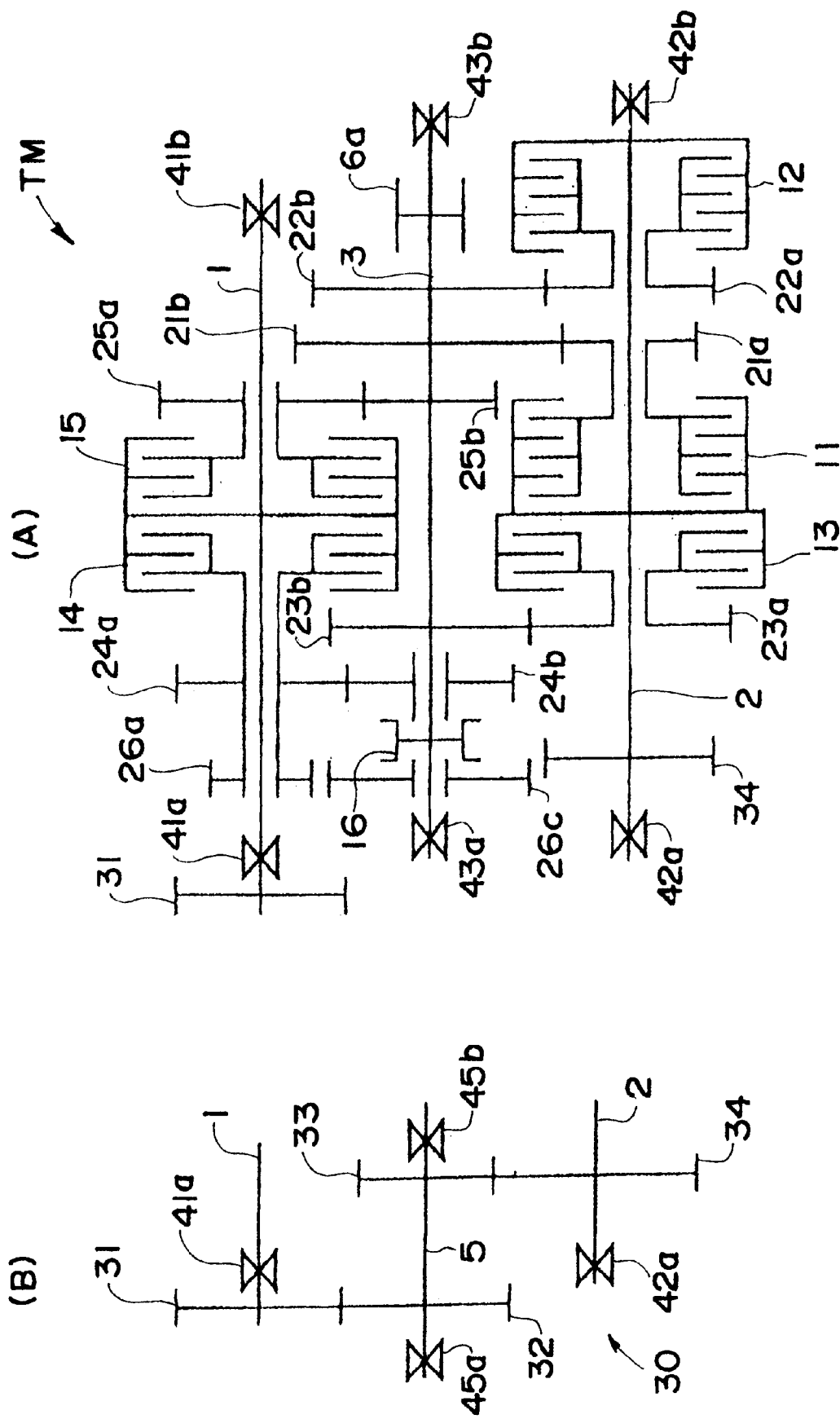
FIG. 3 is a skeleton diagram which shows schematically the power transmission system of the automatic transmission.

The last reduction drive gear 6a meshes with the last reduction driven gear 6b (refer to FIG. 1, which shows that they are situated at the same position in the axial direction though the drawing does not show the actual condition that they mesh with each other). The rotation of the countershaft 3 is transmitted through the last reduction drive and driven gears 6a and 6b to the differential mechanism DF.

Now, a description is given of how each speed ratio is established and through which path the drive power is transmitted at each speed ratio. In this transmission, for establishing the forward drive range, the dog clutch 16 is shifted toward the right side of the drawing, where the dog clutch 16 engages with the FOURTH speed driven gear 24b to connect it rotationally to the countershaft 3. For the reverse drive range, the dog clutch 16 is shifted leftward, where the dog clutch 16 engages with the reverse driven gear 26c to connect it rotationally to the countershaft 3.

First, the establishment of each speed ratio of the forward drive range is described. The LOW ratio is established when the LOW clutch 11 is engaged. The rotational drive power which is input from the torque converter to the first input shaft 1 is transmitted through the connection gear train 30 to the second input shaft 2. Because the LOW clutch 11 is engaged, the LOW drive gear 21a which is driven at the same rotational speed as the second input shaft 2 drives the LOW driven gear 21b mounted on the countershaft 3. This drive power is then transmitted through the last reduction drive and driven gears 6a and 6b to the differential mechanism DF.

The SECOND speed ratio is established when the SECOND speed clutch 12 is engaged. The rotational drive power which is input from the torque converter TC to the first input shaft 1 is transmitted through the connection gear train 30 to the second input shaft 2. Because the SECOND speed clutch 12 is engaged, the SECOND speed drive gear 22a which is driven at the same rotational speed as the second input shaft 2 drives the SECOND speed driven gear 22b mounted on the countershaft 3. This drive power is then transmitted through the last reduction drive and driven gears 6a and 6b to the differential mechanism DF.

The THIRD speed ratio is established when the THIRD speed clutch 13 is engaged. The rotational drive power which is input from the torque converter TC to the first input shaft 1 is transmitted through the connection gear train 30 to the second input shaft 2. Because the THIRD speed clutch 13 is engaged, the THIRD speed drive gear 23a which is driven at the same rotational speed as the second input shaft 2 drives the THIRD speed driven gear 23b mounted on the countershaft 3. This drive power is then transmitted through the last reduction drive and driven gears 6a and 6b to the differential mechanism DF.

The FOURTH speed ratio is established when the FOURTH speed clutch 14 is engaged. The rotational drive power which is input from the torque converter TC to the first input shaft 1 is transmitted through the FOURTH speed clutch 14 to the FOURTH speed drive gear 24a, which drives the FOURTH speed driven gear 24b. Because the dog clutch 16 is kept engaged with the FOURTH speed driven gear 24b for the forward drive range, the countershaft 3 is driven. This drive power is then transmitted through the last reduction drive and driven gears 6a and 6b to the differential mechanism DF.

The FIFTH speed ratio is established when the FIFTH speed clutch 15 is engaged. The rotational drive power which is input from the torque converter TC to the first input shaft 1 is transmitted through the FIFTH speed clutch 15 to the FIFTH speed drive gear 25a, which drives the FIFTH speed driven gear 25b. The FIFTH speed driven gear 25b, which is fixed to the countershaft 3, in turn, drives the countershaft 3. This drive power is then transmitted through the last reduction drive and driven gears 6a and 6b to the differential mechanism DF.

The reverse drive range is established when the FOURTH speed clutch 14 is engaged, and the dog clutch 16 is shifted leftward. The rotational drive power which is input from the torque converter TC to the first input shaft 1 is transmitted through the FOURTH speed clutch 14 to the reverse drive gear 26a, which, in turn, drives the reverse driven gear 26c through the reverse idler gear 26b. Because the dog clutch 16 is engaged with the reverse driven gear 26c for the reverse drive range, the countershaft 3 is driven. This drive power is then transmitted through the last reduction drive and driven gears 6a and 6b to the differential mechanism DF. It should be noted that, as described in this paragraph, the FOURTH speed clutch 14 is used as a reverse clutch for the establishment of the reverse drive range in this transmission in addition to the establishment of the above described FOURTH speed ratio.

Now, in reference to FIGS. 5~10, a description is made of a hydraulic circuit which constitutes a speed change control system in this automatic transmission. FIGS. 6~10 show five sections of the hydraulic circuit at an enlarged scale, which sections are partitioned by alternate long and short dash lines A~E, respectively, in FIG. 5. The points of the oil passages shown open in the hydraulic circuit diagram are connected to a drainage system.

This hydraulic circuit includes an oil pump OP being driven by the engine to supply working oil from an oil tank OT to an oil passage 100. This oil passage 100 is connected through a branch passage 100a to a main regulator valve 50, where the pressure of the oil in the oil passages 100 and 100a is adjusted to a predetermined line pressure PL. This line pressure PL is then supplied through another branch passage 100b to first~fifth on/off solenoid valves 81~85 and to a first linear solenoid valve 86.

Surplus oil from the oil used for the generation of the line pressure PL at the main regulator valve 50 is led to an oil passage 101 and then to another oil passage 102. The oil flowing to the passage 101 is regulated by a lock-up shift valve 51, a lock-up control valve 52 and a torque converter check valve 53, and the oil is used for actuating and locking up the torque converter TC. After being used for the control of the torque converter TC, this oil returns through an oil cooler 54 to the oil tank OT. In this description, no explanation is given of the control of the torque converter TC because the control of the torque converter is not related directly to the present invention. The pressure of the oil supplied to the passage 102 is adjusted by a lubrication relief valve 55, and this oil is used for lubricating various parts of the transmission.

Figure 5:
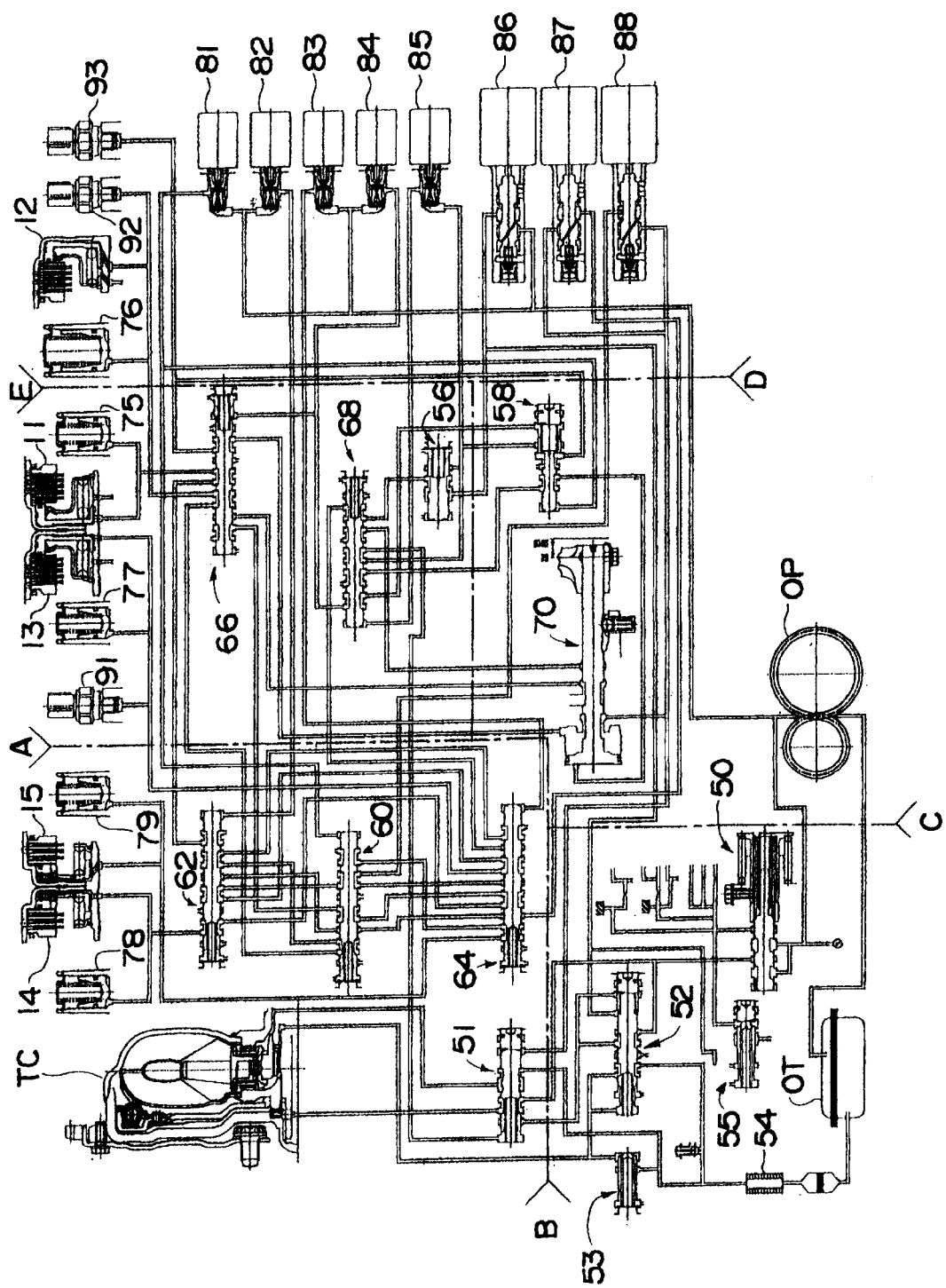
FIG. 5 is a diagram showing a hydraulic circuit of a control system according to the present invention.
Figure 6:
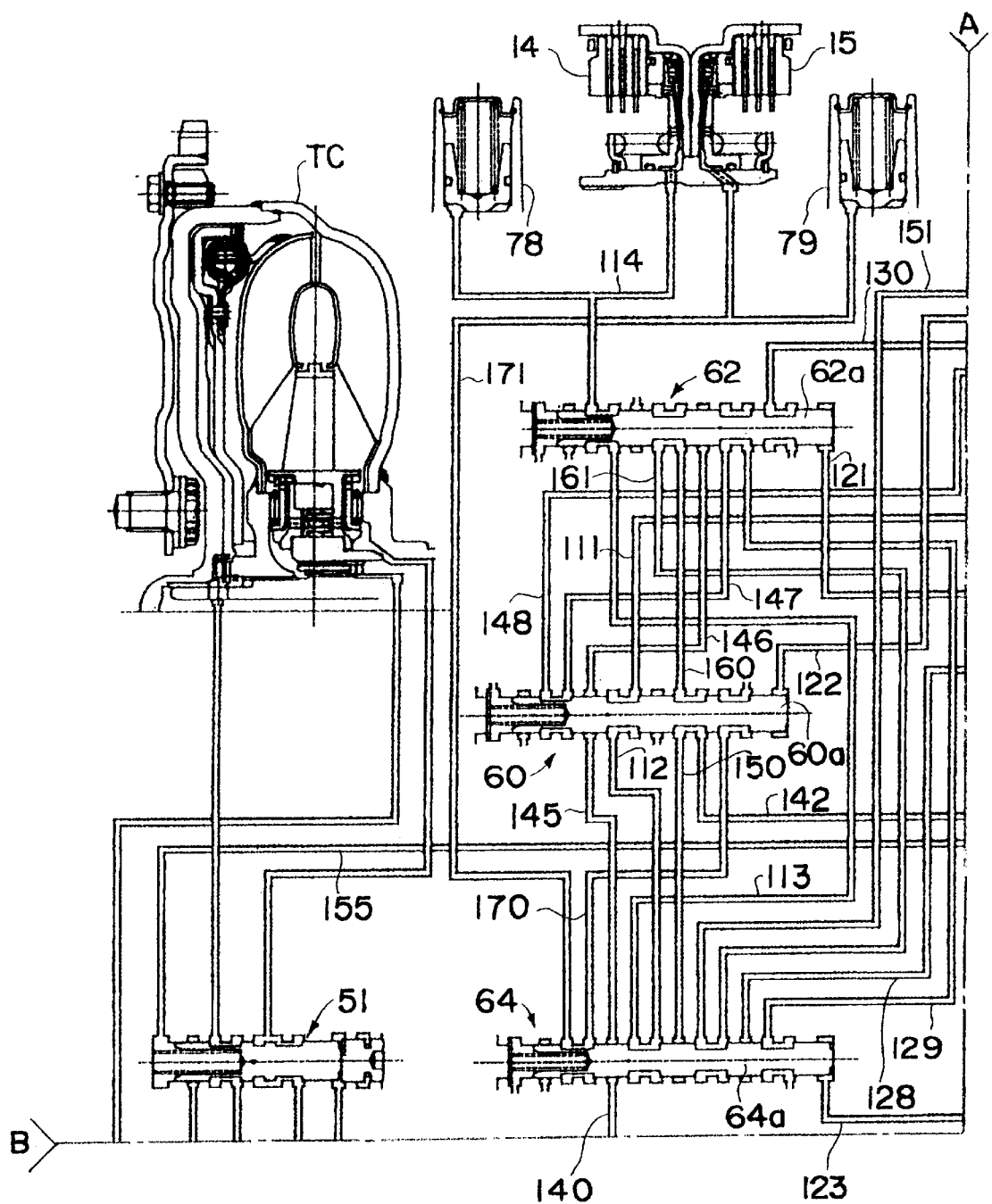
FIGS. 6–10 are diagrams, each showing part of the diagram of FIG. 5, respectively, in enlargement.
Figure 7:
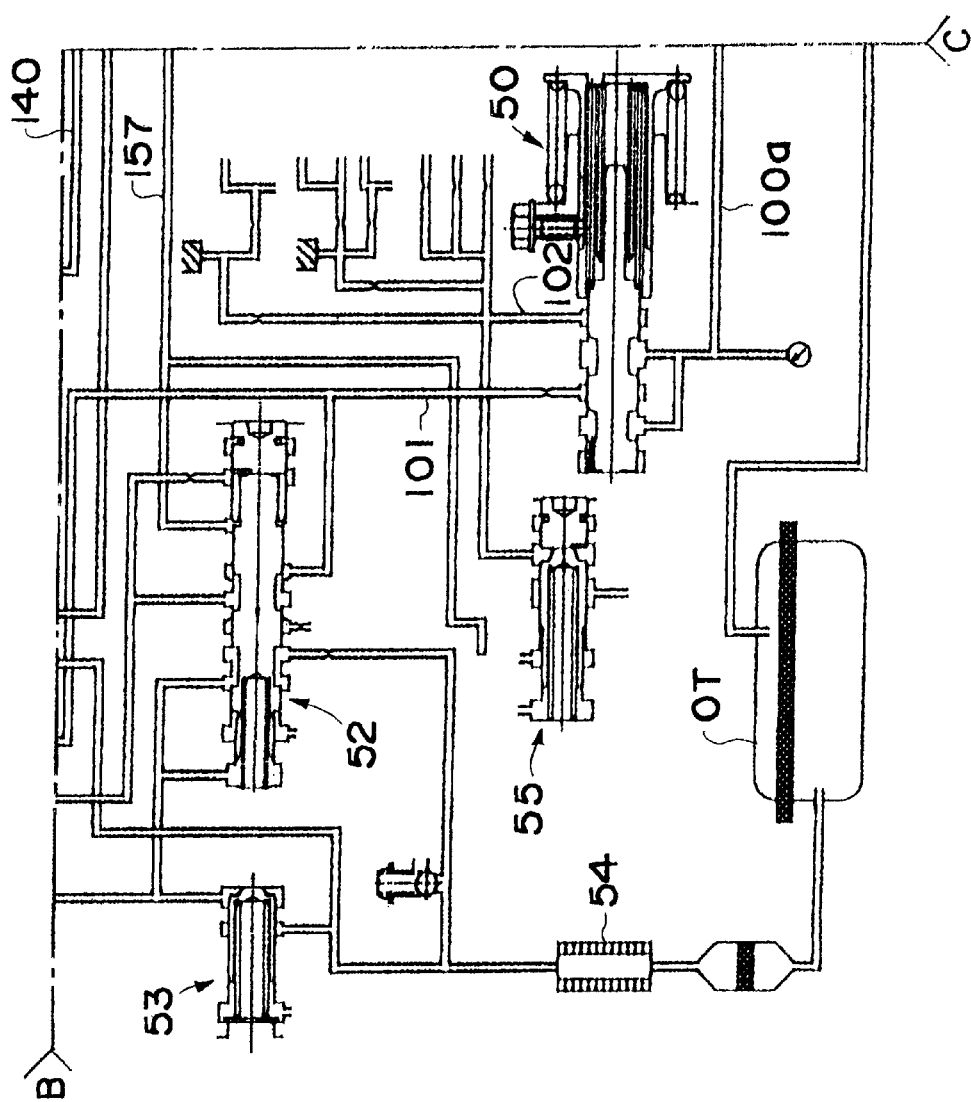
Figure 8:
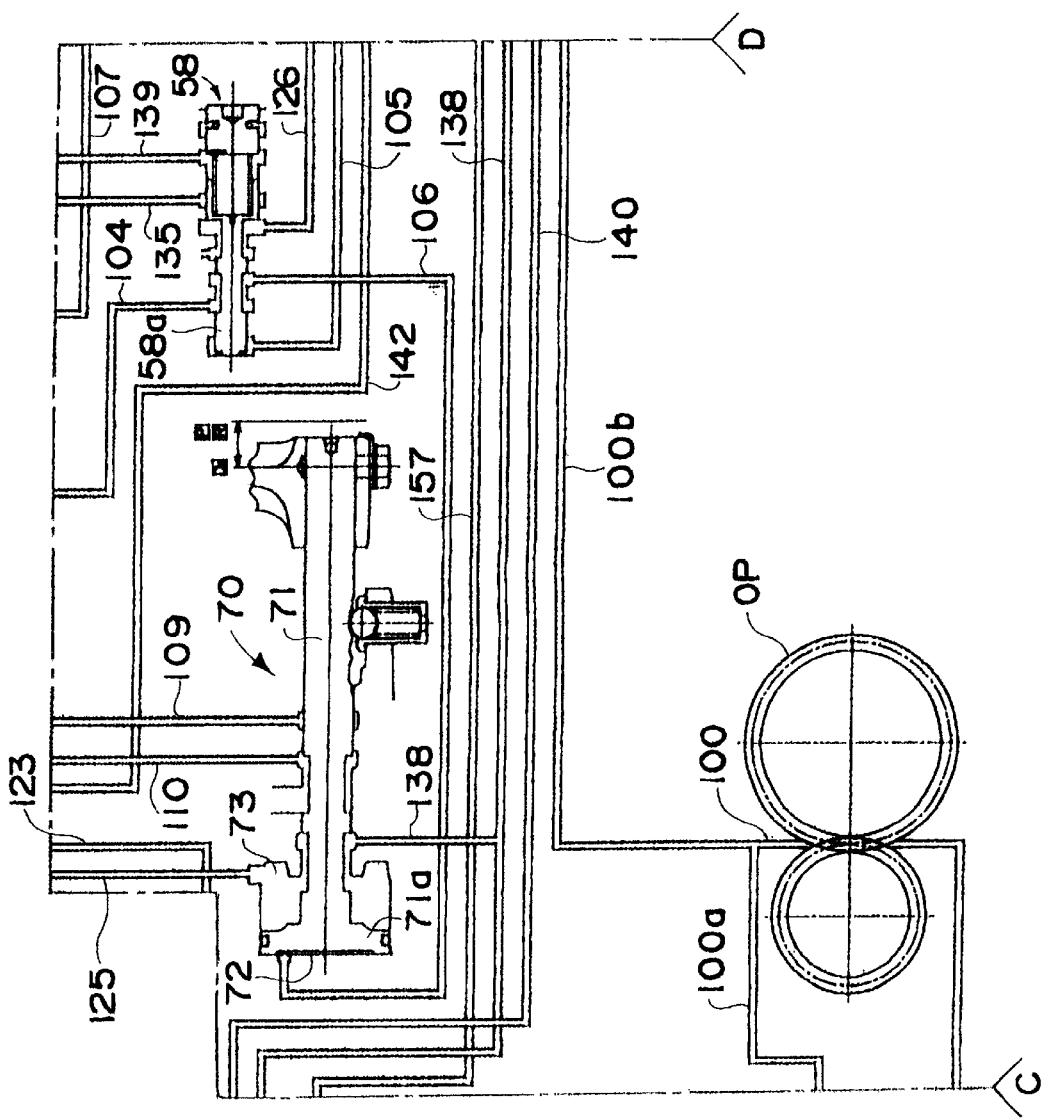
Figure 9:
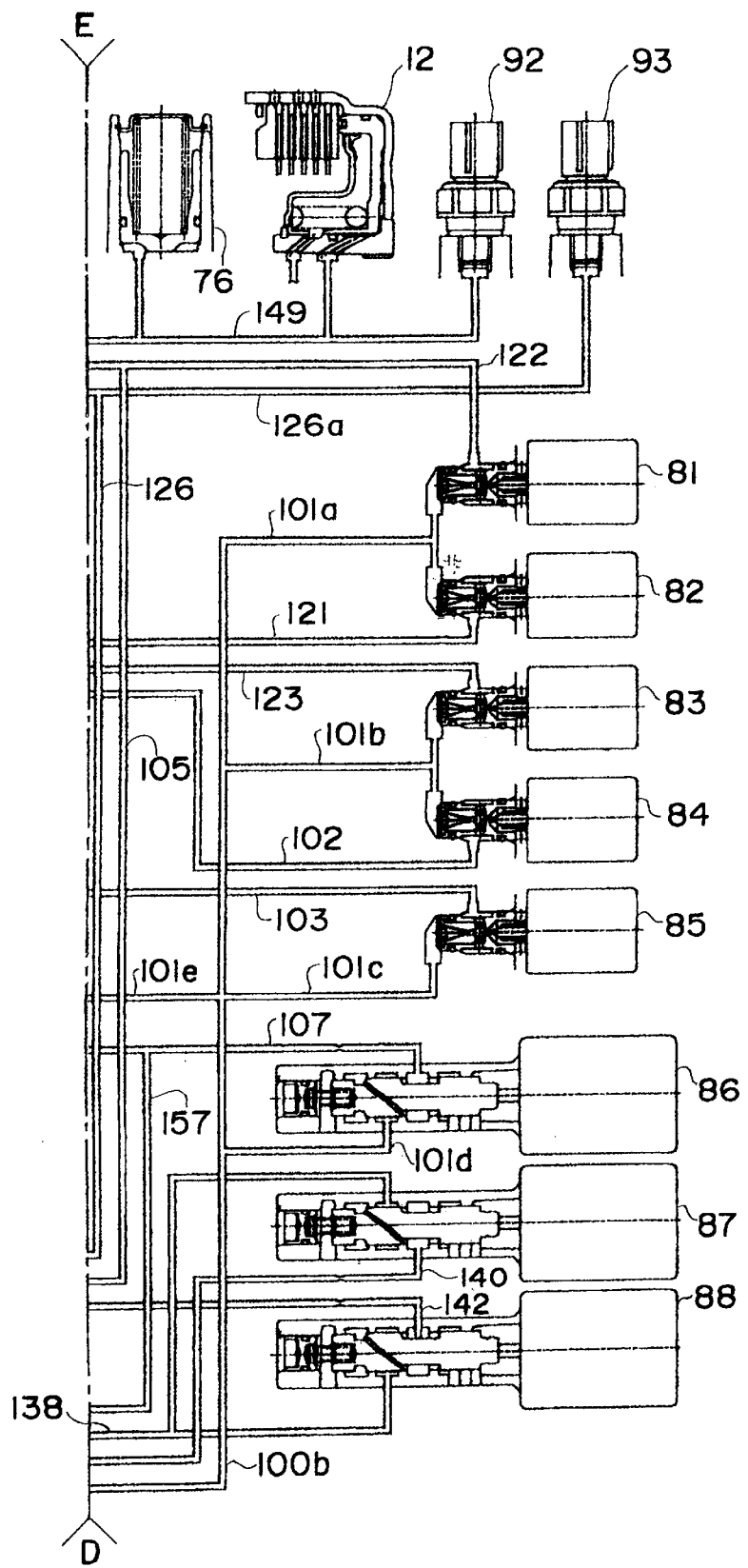
Figure 10:
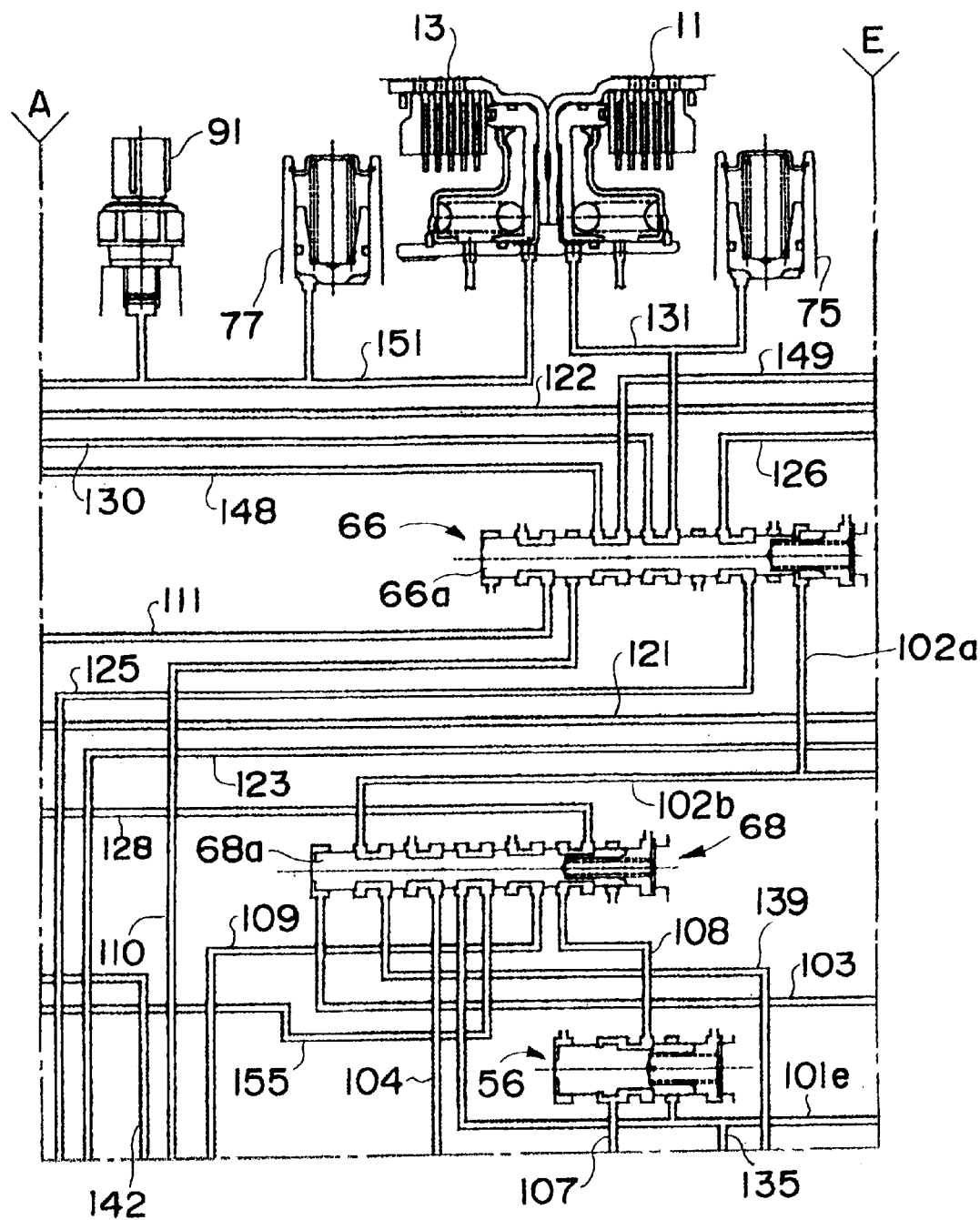

As shown in FIG. 5, a LOW accumulator 75, a SECOND accumulator 76, a THIRD accumulator 77, a FOURTH accumulator 78 and a FIFTH accumulator 79 are connected through oil passages, respectively, to the LOW clutch 11, the SECOND speed clutch 12, the THIRD speed clutch 13, the FOURTH speed clutch 14 and the FIFTH speed clutch 15, which constitute the automatic transmission as described above. This hydraulic circuit is also equipped with a forward/reverse selection hydraulic servomechanism 70 to operate the dog clutch 16.

Furthermore, as shown in the figure, a first shift valve 60, a second shift valve 62, a third shift valve 64, a fourth shift valve 66, a fifth shift valve 68, a CPB valve 56 and a D inhibitor valve 58 are provided to control the hydraulic pressure supplied to these clutches 11~15 and to the forward/reverse selection hydraulic servomechanism 70. To control the actuation of these valves and to control the hydraulic pressure supplied to the clutches, etc, the above mentioned first~fifth on/off solenoid valves 81~85 and the first~third linear solenoid valves 86~88 are arranged appropriately.

Now, the operation of this hydraulic circuit is described for each speed ratio, which is established when the condition of the first~fifth on/off solenoid valves 81~85 is set as listed in Table 1 below. The first~fifth on/off solenoid valves 81~85 are normally closed valves, so each valve opens to generate a signal pressure to actuates other respective valves when its solenoid is electrically energized (i.e., while it is turned ON).

TABLE 1

| | Solenoid valves | | | | | |
|---|---|---|---|---|---|---|
| | 81 | 82 | 83 | 84 | 85 | Mode |
| R | X | X | X | O | O | Reverse |
| N | O | O | O | O | O | First NEUTRAL |
|   | O | X | X | O | X | Second NEUTRAL |
| D | O | O | O | O | X | F/S SECOND |
|   | X | O | O | X | X | In-gear |
|   | O | O | O | X | X | LOW |
|   | X | O | O | X | O/X | 1-2-3 |
|   | X | O | X | X | O/X | SECOND |
|   | X | X | X | X | O/X | THIRD |
|   | X | X | O | X | O/X | 2-3-4 |
|   | O | X | O | X | O/X | FOURTH |
|   | O | X | X | X | O/X | 4-5 |
|   | O | O | X | X | O/X | FIFTH |

At first, a description is given for the establishment of the reverse speed ratio. As shown in Table 1, the first~third on/off solenoid valves 81~83 are turned off and are closed while the fourth and fifth on/off solenoid valves 84 and 85 are turned on and are opened. In this condition, the line pressure PL which is supplied to the fourth and fifth on/off solenoid valves 84 and 85 through oil passages 101b and 101c that branch from the oil passage 100b is supplied to oil passages 102 and 103. The line pressure PL in the passage 102 acts on the right end flange portion of the fourth shift valve 66 through an oil passage 102a and shifts the spool 66a of the valve rightward (this action results in a condition opposite to that shown in the figure). The line pressure PL in the passage 103 acts on the left end of the fifth shift valve 68 and shifts the spool 68a of the valve rightward (this results in a condition opposite to that shown in the figure). As a result, an oil passage 102b that is branched from the passage 102 is blocked at the fifth shift valve 68.

On the other hand, the line pressure PL being supplied to the fifth shift valve 68 through an oil passage 101e that is branched from the passage 100b is supplied through a groove provided on the spool 68a of the fifth shift valve 68 to an oil passage 104, which leads to the D inhibitor valve 58. In this condition, because an oil passage 105 connected to the left end of the D inhibitor valve 58 is connected to a drain at the first on/off solenoid valve 81, the spool 58a of the D inhibitor valve 58 is positioned to the left side of the valve (this position of the spool 58a is hereinafter referred to as "reverse drive position"), so the passage 104 is connected with a passage 106 which is connected to the left side oil chamber 72 of the forward/reverse selection hydraulic servomechanism 70. Therefore, the line pressure PL being supplied into the left side oil chamber 72 pushes rightward the piston portion 71a of a rod 71 which is provided in the forward/reverse selection hydraulic servomechanism 70. When the rod 71, which is provided with a shift fork to operate the dog clutch 16, is shifted rightward, the dog clutch 16 engages with the reverse driven gear 26c to connect it rotationally to the countershaft 3.

As mentioned previously, the reverse drive range is established when the dog clutch 16 is engaged with the reverse driven gear 26c and the FOURTH speed clutch 14 is engaged. The engagement of the FOURTH speed clutch 14 is actuated by the first linear solenoid valve 86, to which the line pressure PL is supplied through an oil passage 101d. At the first linear solenoid valve 86, the supply of the line pressure to another oil passage 107 is adjusted by means of electrical control of the current flowing through the solenoid of the valve (pressure adjustment control).

This passage 107 is connected with another oil passage 108 through the CPB valve 56, and this oil passage 108 is connected with another oil passage 109 through a passage which is created when the spool 68a of the fifth shift valve 68 is shifted rightward. This oil passage 109 is then connected with another oil passage 110 through a passage which is created by a groove of the rod 71 of the forward/reverse selection hydraulic servomechanism 70 when the rod is shifted rightward. This oil passage 110 is then connected with another oil passage 111 through a passage which is created when the spool 66a of the fourth shift valve 66 is shifted rightward. Then, this oil passage 111 is connected with another oil passage 112 through a passage which is created when the spool 60a of the first shift valve 60 is shifted rightward. This oil passage 112 is then connected with another oil passage 113 through a passage which is created when the spool 64a of the third shift valve 64 is shifted rightward. Furthermore, this oil passage 113 is connected with another oil passage 114 through a passage which is created when the spool 62a of the second shift valve 62 is shifted rightward. This oil passage 114 is then connected to the actuation oil chamber of the FOURTH speed clutch 14 and to the FOURTH accumulator 78. In this arrangement, the engagement of the FOURTH speed clutch 14 is controlled by the first linear solenoid valve 86 for setting the reverse speed ratio.

Now, the control for establishing the neutral range is described. As shown in Table 1, the neutral range comprises First and Second NEUTRAL modes. The First NEUTRAL mode takes place when the neutral range (N range) or the reverse drive range (R range) is selected while the vehicle is driving at a speed greater than a predetermined speed (e.g., 10 km/h) in the forward drive range (D range). The First NEUTRAL mode functions as a reverse inhibitor to prevent the transmission from shifting to the reverse speed ratio in such a condition. The Second NEUTRAL mode takes place when the transmission shifts from the reverse drive range to the neutral range and from the forward drive range to the neutral range. Moreover, when the transmission shifts from the reverse drive range through the Second NEUTRAL mode to the forward drive range, the transmission goes through the In-gear mode listed in Table 1. On the other hand, if the transmission, after having shifted from the reverse drive range to the Second NEUTRAL mode, is operated to shift from the Second NEUTRAL mode to the reverse drive range, the transmission shifts directly to the reverse drive range without going through the In-gear mode. In the same way, the Second NEUTRAL mode takes place when the transmission shifts from the forward drive range to the reverse drive range, so the reverse drive range is established after the D inhibitor valve 58 is actuated to a reverse mode. However, if the transmission, after having shifted from the forward drive range to the Second NEUTRAL mode, is operated to shift from the Second NEUTRAL mode to the forward drive range, the transmission shifts directly to the forward drive range without any mode change of the D inhibitor valve 58.

In the First NEUTRAL mode, all the first~fifth on/off solenoid valves 81~85 are turned on and are open. Therefore, when the mode of the transmission is changing from the reverse speed ratio or reverse drive range to the First NEUTRAL mode, the first~third on/off solenoid valves 81~83, which have been closed for setting the reverse drive range, are now opened, and the supply of hydraulic oil through these valves starts. At first, the line pressure PL which is supplied to the first on/off solenoid valve 81 through the oil passage 101a is now led to an oil passage 122 which is connected to the right end of the first shift valve 60. With this supply of the line pressure PL, the spool 60a of the first shift valve 60 is shifted leftward. As the oil passage 122 is connected also with the oil passage 105, the line pressure is supplied also to the left end of the D inhibitor valve 58 through the passage 105. As a result, the spool 58a of the D inhibitor valve shifts rightward (this position of the spool 58a is hereinafter referred to as "forward drive position"). In this condition, the passage 106 which is connected to the left side oil chamber 72 of the forward/reverse selection hydraulic servomechanism 70 is connected to a drain through the D inhibitor valve 58, so the hydraulic oil in the left side oil chamber 72 is drained.

In the condition where the spool 58a of the D inhibitor valve 58 is shifted to the right side thereof, the line pressure PL is supplied into the D inhibitor valve 58 through the oil passages 101e and 135, and this pressure acts on the spool 58a to maintain the spool on the right side of the valve even after the line pressure supplied from the oil passage 105 is terminated. To the D inhibitor valve 58, another oil passage 139 is arranged such that the line pressure led through this passage acts on the spool 58a to shift the spool leftward. Therefore, only when the line pressure is led through this oil passage 139, the spool 58a of the D inhibitor valve 58 can shift leftward. In the condition where the spool 58a is shifted rightward, the line pressure PL is supplied to an oil passage 126 whose branching passage 126a leads the pressure to a hydraulic switch 93. Therefore, the line pressure PL supplied to the oil passage 126 is detected by the hydraulic switch 93.

Also, the line pressure supplied through the oil passage 101a to the second on/off solenoid valve 82 is now led to the oil passage 121 which is connected to the right end of the second shift valve 62. With this supply of hydraulic pressure, the spool 62a of the second shift valve 62 shifts leftward. Furthermore, the line pressure supplied through the oil passage 101b to the third on/off solenoid valve 83 is led to the oil passage 123 which is connected to the right end of the third shift valve 64. With this pressure, the spool 64a of the third shift valve 64 shifts leftward. As a result, the oil passage 114 connected to the oil chamber of the FOURTH speed clutch 14 is now connected to a drain through a groove provided on the spool of the second shift valve 62, and the FOURTH speed clutch 14 is released to set a neutral condition.

In this condition, as the spool 58a of the D inhibitor valve 58 is maintained to the right side thereof, the passage 106 connected to the left side oil chamber 72 of the forward/reverse selection hydraulic servomechanism 70 is in fluid communication to a drain at the D inhibitor valve 58. On the other hand, the line pressure is supplied into the right side oil chamber 73 of the forward/reverse selection hydraulic servomechanism 70 as the oil passage 125 which is connected to the right side oil chamber 73 is in fluid communication with the oil passage 101e through the oil passage 126, the D inhibitor valve 58 and another oil passage 135. As a result, in the First NEUTRAL mode, the rod 71 of the forward/reverse selection hydraulic servomechanism 70 is shifted and maintained to the left side, so the dog clutch 16 is shifted and maintained to a D range position. In the First NEUTRAL mode, as the forward/reverse selection hydraulic servomechanism 70 remains in this condition, i.e., at the D range position, it is not possible to establish a reverse speed ratio.

In the Second NEUTRAL mode, the first and fourth on/off solenoid valves 81 and 84 are turned on and are open while the second, third and fifth on/off solenoid valves 82, 83 and 85 are turned off and are closed. In response to this actuation condition of the solenoid valves, the shift valves are set as follows: the spool 60a of the first shift valve 60 is shifted leftward, the spool 62a of the second shift valve 62 is shifted rightward, the spool 64a of the third shift valve 64 is shifted rightward, the spool 66a of the fourth shift valve 66 is shifted rightward, and the spool 68a of the fifth shift valve 68 is shifted leftward.

Now, the line pressure is supplied from the fourth on/off solenoid valve 84 through an oil passage 102b and the fourth shift valve 66 to an oil passage 139 which leads to the D inhibitor valve 58. As a result, the spool 58a of the D inhibitor valve 58 is shifted leftward to the reverse drive position. In this condition, as the spool 66a of the fourth shift valve 66 is shifted rightward, the oil passage 125 connected to the right side oil chamber 73 of the forward/reverse selection hydraulic servomechanism 70 is connected to a drain at the fourth shift valve 66. On the other hand, the passage 106 connected to the left side oil chamber 72 of the forward/reverse selection hydraulic servomechanism 70 is connected to a drain through the D inhibitor valve 58 and the fifth shift valve 68. As a result, without any axially acting force, the rod 71 of the forward/reverse selection hydraulic servomechanism 70 remains in the same condition which has existed before the transmission takes this Second NEUTRAL mode. No force is generated in the axial direction until the spool 68a of the fifth shift valve 68 is shifted rightward.

Now, each mode for the forward drive range (D range) is described. The In-gear mode takes place, for example, when the shift lever is manipulated from the N position to the D position to engage gears, and the In-gear mode prepares the transmission to start the engagement of the LOW clutch 11. In this mode, the second and third on/off solenoid valves 82 and 83 are turned on and are open while the first, fourth and fifth on/off solenoid valves 81, 84 and 85 are turned off and are closed. In response to this actuation condition of the solenoid valves, the shift valves are set as follows: the spool 60a of the first shift valve 60 is shifted rightward, the spool 62a of the second shift valve 62 is shifted leftward, the spool 64a of the third shift valve 64 is shifted leftward, the spool 66a of the fourth shift valve 66 is shifted leftward, an d the spool 68a of the fifth shift valve 68 is shifted leftward.

In the In-gear mode, the LOW clutch 11 is controlled to engage gradually by the first linear solenoid valve 86. The hydraulic pressure adjusted by the first linear solenoid valve 86 is supplied to the oil passage 107 which is connected with the oil passage 108 through the CPB valve 56. This oil passage 108 is connected with another oil passage 128 through a passage which is created when the spool 68a of the fifth shift valve 68 is shifted leftward. The oil passage 128 is then connected with another oil passage 129 through a passage which is created when the spool 64a of the third shift valve 64 is shifted leftward. Then, the oil passage 129 is connected with another oil passage 130 through a passage which is created when the spool 62a of the second shift valve 62 is shifted leftward. This oil passage 130 is then connected with another oil passage 131 through a passage which is created when the spool 66a of the fourth shift valve 66 is shifted leftward. This oil passage 131 is then connected to the oil chamber of the LOW clutch 11 and to the LOW accumulator 75. In this arrangement, the LOW clutch 11 is engaged gradually in correspondence to the activation of the first linear solenoid valve 86.

In the In-gear mode, the oil passage 125 connected to the right side oil chamber 73 of the forward/reverse selection hydraulic servomechanism 70 is connected with the oil passage 126 through a passage which is created by the leftward shift of the spool 66a of the fourth shift valve 66. This oil passage 126 is then connected with the oil passage 135 which leads to the oil passage 101e, through a passage created by the rightward shift of the spool 58a of the D inhibitor valve 58 (placed at the forward drive position). On the other hand, the passage 106 connected to the left side oil chamber 72 of the forward/reverse selection hydraulic servomechanism 70 is connected through the D inhibitor valve 58 with the oil passage 104 which is drained at the fifth shift valve 68 whose spool 68a is shifted on the left side thereof. As a result, the line pressure PL being supplied into the right side oil chamber 73 of the forward/reverse selection hydraulic servomechanism 70 acts on the rod 71 and pushes it leftward. Therefore, in the In-gear mode, the rod 71 of the forward/reverse selection hydraulic servomechanism 70 is shifted leftward as shown in the figure, so the dog clutch 16 shifts to the D range position and engages with the FOURTH speed driven gear 24b to connect it rotationally to the countershaft 3.

When the dog clutch 16 is shifted to the D range position (i.e., set for the forward drive range), the line pressure is led through the oil passage 126a branching from the passage 126 to the hydraulic switch 93, turning this switch 93 on. In other words, the hydraulic switch 93 is used to detect whether the line pressure to set the D range is actually being supplied into the right side oil chamber 73 of the forward/reverse selection hydraulic servomechanism 70 or not.

Now, a description is given of the LOW mode. In the LOW mode, which is set, for example, to start the vehicle when the D range is selected, the first~third on/off solenoid valves 81~83 are turned on and are opened while the fourth and fifth on/off solenoid valves 84 and 85 are turned off and are closed. In this condition, the spool 60a of the first shift valve 60 is shifted to the left side, the spool 62a of the second shift valve 62 is shifted to the left side, the spool 64a of the third shift valve 64 is shifted to the left side, the spool 66a of the fourth shift valve 66 is shifted to the left side, and the spool 68a of the fifth shift valve 68 is shifted to the left side.

The LOW mode differs from the In-gear mode only in the actuation of the first on/off solenoid valve 81. In the LOW mode, the first on/off solenoid valve 81 is turned on, so the spool 60a of the first shift valve 60 is shifted leftward. Then, the line pressure PL being supplied from the first on/off solenoid valve 81 to the oil passage 122 is led through the oil passage 105 to the left end of the D inhibitor valve 58, so the spool 58a of the D inhibitor valve 58 is shifted rightward. In this condition, the oil passage 135 branching from the oil passage 101e, to which the line pressure PL is being supplied, is connected with the oil passage 126 through the D inhibitor valve 58, so the line pressure PL is now supplied to the D inhibitor valve 58 through the oil passage 126.

In the condition where the oil passage 135 is connected with the oil passage 126, the spool 58a of the D inhibitor valve 58 is pushed rightward by the line pressure PL being supplied, so the spool 58a remains on the right side of the valve even after the line pressure supplied through the oil passage 105 is terminated. This spool 58a remains on the right side unless the line pressure from the oil passage 139 acts on the spool 58a and pushes leftward which pressure is only available when the fourth on/off solenoid valve 84 is turned on to shift the spool 68a of the fifth shift valve 68 rightward. Therefore, once the spool 58a of the D inhibitor valve 58 is shifted rightward, it remains on the right side until the fourth on/off solenoid valve 84 is turned on. Here, it can be understood clearly from Table 1 that the fourth on/off solenoid valve 84 is turned off for the D range (except for the F/S SECOND mode), so the spool 58a of the D inhibitor valve 58 remains at the forward drive position.

Now, the oil passage 126 is connected with the oil passage 125 through a passage created by the leftward shift of the spool 66a of the fourth shift valve 66, so the line pressure PL is supplied through the oil passage 125 to the right side oil chamber 73 of the forward/reverse selection hydraulic servomechanism 70. This supply of the line pressure into the right side oil chamber 73 is detected by the hydraulic switch 93 while the rod 71 in the servomechanism is being shifted leftward. By this movement of the rod, the dog clutch 16 is shifted to the D range position and engaged with the FOURTH speed driven gear 24b, and as a result, this driven gear is connected rotationally to the countershaft 3. In the condition where the rod 71 is on the left side, the right side oil chamber 73 is connected to an oil passage 138 through which the line pressure PL is supplied to the second and third linear solenoid valves 87 and 88. Now, the line pressure PL is adjustable with the second and third linear solenoid valves 87 and 88, and this adjusted pressure can be supplied as control pressures to oil passages 140 and 142, respectively. However, no control pressure is output from these linear solenoid valves 87 and 88 in the LOW mode.

In the LOW mode, the control pressure being supplied from the first linear solenoid valve 86 to the oil passage 107 is led to the LOW clutch 11 in the same way as in the In-gear mode. Therefore, the engagement of the LOW clutch 11 is controlled in correspondence to the actuation of the first linear solenoid valve 86.

Now, a description is given of the 1-2-3 mode. This mode is set to shift the speed ratio of the transmission among the first (LOW), second, and THIRD speed ratios, i.e., to control the transition of speed ratio change. In this mode, the second and third on/off solenoid valves 82 and 83 are turned on and are opened while the first and fourth on/off solenoid valves 81 and 84 are turned off and are closed. The fifth on/off solenoid valve 85 is turned off when the FIRST speed ratio is established, and it is turned on or off in lock-up clutch actuation control (no description is provided on this control because it is not relevant to the present invention) when the second or THIRD speed ratio is established. In the 1-2-3 mode, the spool 60a of the first shift valve 60 is shifted rightward, the spool 62a of the second shift valve 62 is shifted leftward, the spool 64a of the third shift valve 64 is shifted leftward, and the spool 66a of the fourth shift valve 66 is shifted leftward.

As the fourth on/off solenoid valve 84 is turned off, the spool 58a of the D inhibitor valve 58 is maintained to the right side. In this condition, the line pressure PL is supplied to the right side oil chamber 73 of the forward/reverse selection hydraulic servomechanism 70, and this supply of the line pressure to the right side oil chamber 73 is detected by the hydraulic switch 93. As a result, the dog clutch 16 is maintained at the D range position. In addition, the line pressure PL is supplied through the oil passage 138 to the second and third linear solenoid valves 87 and 88.

In this mode, the engagement of the LOW clutch 11, the SECOND speed clutch 12 or the THIRD speed clutch 13 is controlled in correspondence to the actuation of the first, second and third linear solenoid valve 86, 87 and 88. The control pressure being supplied from the first linear solenoid valve 86 to the oil passage 107 is led to the oil passage 108 through the CPB valve 56. This oil passage 108 is connected with the oil passage 128 through the fifth shift valve 68, and this oil passage 128 is connected with the oil passage 129 through the third shift valve 64. Then, this oil passage 129 is connected with the oil passage 130 through the second shift valve 62, and this oil passage 130 is connected with the oil passage 131 through the fourth shift valve 66. This oil passage 131 is then connected to the LOW clutch 11. In this condition, the engagement of the LOW clutch 11 is controlled by means of the control pressure supplied from the first linear solenoid valve 86.

The primary pressure of the second linear solenoid valve 87 is the pressure supplied through the oil passage 138, which pressure is supplied only when the forward/reverse selection hydraulic servomechanism 70 is set at the D range position. This primary pressure is adjusted by the second linear solenoid valve 87 to a control pressure which is supplied to an oil passage 140. In this present condition, this oil passage 140 is connected through the third shift valve 64 with an oil passage 145, which is connected with an oil passage 146 through the first shift valve 60. This oil passage 146 is then connected with another oil passage 147 through the second shift valve 62, and this oil passage 147 is then connected with another oil passage 148 through the first shift valve 60. Then, this oil passage 148 is connected with another oil passage 149 through the fourth shift valve 66, and this oil passage 149 is connected to the SECOND speed clutch 12, a hydraulic switch 92 and the SECOND accumulator 76. In this arrangement, the control pressure from the second linear solenoid valve 87 is utilized for the engagement control of the SECOND speed clutch 12.

In this way, the hydraulic pressure generated only under the condition that the forward/reverse selection hydraulic servomechanism 70 is at the D range position is supplied as primary pressure to the second linear solenoid valve 87. Then, the supply of this pressure is detected by the hydraulic switch 92. In other words, the hydraulic switch 92 is used to confirm that the forward/reverse selection hydraulic servomechanism 70 is set at the D range position.

The control pressure generated at the third linear solenoid valve 88 is supplied to the oil passage 142 which is connected with another oil passage 150 through the first shift valve 60. This oil passage 150 is connected through the third shift valve 64 with another oil passage 151 which is connected to the THIRD speed clutch 13 and the THIRD accumulator 77. As a result, the control pressure form the third linear solenoid valve 88 is utilized for the engagement control of the THIRD speed clutch 13.

Now, a description is given of the SECOND mode, which is set for the engagement of the SECOND speed clutch 12. In this mode, the second on/off solenoid valve 82 is turned on and is opened while the first, third and fourth on/off solenoid valves 81, 83 and 84 are turned off and are closed. The fifth on/off solenoid valve 85 is turned on or off depending upon the condition of the lock-up clutch actuation control. In this condition, the spool 60a of the first shift valve 60 is shifted rightward, the spool 62a of the second shift valve 62 is shifted leftward, the spool 64a of the third shift valve 64 is shifted rightward, and the spool 66a of the fourth shift valve 66 is shifted leftward.

As the fourth on/off solenoid valve 84 is turned off also in this mode, the spool 58a of the D inhibitor valve 58 is maintained on the right side. Therefore, the line pressure PL is supplied to the right side oil chamber 73 of the forward/reverse selection hydraulic servomechanism 70, so the dog clutch 16 is retained at the D range position. Here, the supply of the line pressure to the right side oil chamber 73 is also detected by the hydraulic switch 93. In this condition, the line pressure PL is supplied through the oil passage 138 to the second and third linear solenoid valves 87 and 88.

In this mode, the engagement of the SECOND speed clutch 12 is controlled by the control pressure supplied from the second linear solenoid valve 87 to the oil passage 140. This oil passage 140 is connected through the third shift valve 64 with the oil passage 145, which is connected with the oil passage 146 through the first shift valve 60. This oil passage 146 is then connected with the oil passage 147 through the second shift valve 62, and this oil passage 147 is connected with the oil passage 148 through the first shift valve 60. Furthermore, this oil passage 148 is connected with the oil passage 149 through the fourth shift valve 66, and this oil passage 149 is connected to the SECOND speed clutch 12 and to the SECOND accumulator 76. In this arrangement, the engagement of the SECOND speed clutch 12 is controlled by the control pressure supplied from the second linear solenoid valve 87.

As described above, the primary pressure for the second linear solenoid valve 87 is taken from the pressure in the oil passage 138, which pressure is generated only when the forward/reverse selection hydraulic servomechanism 70 is set at the D range position. The second linear solenoid valve 87 adjusts this primary pressure and produces the secondary pressure or control pressure which is led into the oil passage 140. In this way, the hydraulic pressure generated only under the condition that the forward/reverse selection hydraulic servomechanism 70 is at the D range position is supplied as primary pressure to the second linear solenoid valve 87, and the control pressure produced by the second linear solenoid valve 87 is then supplied to the SECOND speed clutch 12. This control pressure supply is detected by the hydraulic switch 92. In other words, the hydraulic switch 92 is used to confirm that the forward/reverse selection hydraulic servomechanism 70 is set at the D range position.

Here, the control of the lock-up clutch performed by the fifth on/off solenoid valve 85 is described briefly. By the turning on or off of this solenoid valve 85, the position of the spool 68a of the fifth shift valve 68 is controlled leftward or rightward, respectively. In the condition where this spool 68a is shifted leftward, the oil passage 101e is connected with another oil passage 155, and the line pressure PL is supplied to the left end of the lock-up shift valve 51. On the other hand, in the condition where the spool 68a is shifted rightward, the oil passage 155 is connected to a drain at the fifth shift valve 68, so no pressure is supplied to the left end of the lock-up shift valve 51. In this way, the turning on and off of the fifth on/off solenoid valve 85 is utilized for the control of the actuation of the lock-up shift valve 51.

The lock-up shift valve 51 is a valve to turn on or off the lock-up actuation, and the engagement of the lock-up clutch is controlled by the control pressure supplied from the first linear solenoid valve 86. The control pressure from the first linear solenoid valve 86 is led to the oil passage 107, which is connected through another oil passage 157 to the lock-up control valve 52. Thus, the actuation of the lock-up control valve 52, which is controlled by the control pressure from the first linear solenoid valve 86, controls the engagement of the lock-up clutch. This engagement control of the lock-up clutch is carried out in the same way for the speed ratios which are equal to or higher than the SECOND speed ratio.

Now, a description is given of the THIRD mode, which is set for the engagement of the THIRD speed clutch 13. In this mode, the first~fourth on/off solenoid valves 81~84 are turned off and are closed. The fifth on/off solenoid valve 85 is turned on or off depending upon the condition of the lock-up clutch actuation control as in the above described mode. In this condition, the spool 60a of the first shift valve 60 is shifted rightward, the spool 62a of the second shift valve 62 is shifted rightward, the spool 64a of the third shift valve 64 is shifted rightward, and the spool 66a of the fourth shift valve 66 is shifted leftward.

As the fourth on/off solenoid valve 84 is turned off also in this mode, the spool 58a of the D inhibitor valve 58 is maintained on the right side. Therefore, the line pressure PL is supplied to the right side oil chamber 73 of the forward/reverse selection hydraulic servomechanism 70, so the dog clutch 16 is retained at the D range position. Here, the supply of the line pressure to the right side oil chamber 73 is also detected by the hydraulic switch 93. In this condition, the line pressure PL is supplied through the oil passage 138 to the second and third linear solenoid valves 87 and 88.

In this mode, the engagement of the THIRD speed clutch 13 is controlled by the control pressure supplied from the third linear solenoid valve 88 to the oil passage 142, which is connected with another oil passage 160 through the first shift valve 60. This oil passage 160 is then connected with another oil passage 161 through the second shift valve 62, and this oil passage 161 is then connected through the third shift valve 64 with the oil passage 151, which is connected to the THIRD speed clutch 13 and to the THIRD accumulator 77. In this arrangement, the engagement of the THIRD speed clutch 13 is controlled by the control pressure from the third linear solenoid valve 88.

Again, the primary pressure for the third linear solenoid valve 88 is taken from the pressure in the oil passage 138, which pressure is generated only when the forward/reverse selection hydraulic servomechanism 70 is set at the D range position. The third linear solenoid valve 88 adjusts this primary pressure and produces the secondary or control pressure which is led into the oil passage 142. In this way, the hydraulic pressure generated only under the condition that the forward/reverse selection hydraulic servomechanism 70 is at the D range position is supplied as primary pressure to the third linear solenoid valve 88, and the control pressure produced by the third linear solenoid valve 88 is then supplied to the THIRD speed clutch 13. This supply of the control pressure is detected by the hydraulic switch 91. In other words, the hydraulic switch 91 is used to confirm that the forward/reverse selection hydraulic servomechanism 70 is set at the D range position.

Now, a description is given of the 2-3-4 mode. This mode is set to shift the speed ratio of the transmission among the second, third and FOURTH speed ratios, i.e., to control the transition of speed ratio change. In this mode, the third on/off solenoid valve 83 is turned on and is opened while the first, second and fourth on/off solenoid valves 81, 82 and 84 are turned off and are closed. The fifth on/off solenoid valve 85 is used in the lock-up clutch actuation control as briefly described above. In the 2-3-4 mode, the spool 60*a* of the first shift valve 60 is shifted rightward, the spool 62*a* of the second shift valve 62 is shifted rightward, the spool 64*a* of the third shift valve 64 is shifted leftward, and the spool 66*a* of the fourth shift valve 66 is shifted leftward.

Also in this mode, as the fourth on/off solenoid valve 84 is turned off, the spool 58*a* of the D inhibitor valve 58 is maintained on the right side thereof. In this condition, the line pressure PL is supplied to the right side oil chamber 73 of the forward/reverse selection hydraulic servomechanism 70, so the dog clutch 16 is retained at the D range position. Here, the supply of the line pressure to the right side oil chamber 73 is also detected by the hydraulic switch 93. In this condition, the line pressure PL is supplied through the oil passage 138 to the second and third linear solenoid valves 87 and 88.

In this mode, the engagement of the SECOND speed clutch 12, the THIRD speed clutch 13 and the FOURTH speed clutch 14 is controlled in correspondence to the actuation of the first, second and third linear solenoid valves 86, 87 and 88 to shift the transmission smoothly among these speed ratios.

The control pressure supplied from the first linear solenoid valve 86 to the oil passage 107 is led to the oil passage 108 through the CPB valve 56. This oil passage 108 is connected through the fifth shift valve 68 with the oil passage 128, which is connected with the oil passage 129 through the third shift valve 64. Then, this oil passage 129 is connected with the oil passage 147 through the second shift valve 62, and this oil passage 147 is connected with the oil passage 148 through the first shift valve 60. This oil passage 148 is then connected through the fourth shift valve 66 with the oil passage 149, which is connected to the SECOND speed clutch 12. In this arrangement, the engagement of the SECOND speed clutch 12 is controlled by the control pressure supplied from the first linear solenoid valve 86.

The control pressure from the second linear solenoid valve 87 is led to the oil passage 140, which is connected with the oil passage 113 through the third shift valve 64. This oil passage 113 is connected with the oil passage 114 through the second shift valve 62, and this oil passage 114 is connected to the FOURTH speed clutch 14 and to the FOURTH accumulator 78. In this arrangement, the engagement of the FOURTH speed clutch 14 is control by the control pressure supplied from the second linear solenoid valve 87.

The control pressure from the third linear solenoid valve 88 is supplied to the oil passage 142, which is connected with the oil passage 150 through the first shift valve 60. This oil passage 150 is then connected with the oil passage 151 through the third shift valve 64, and then this oil passage 151 is connected to the THIRD speed clutch 13 and to the THIRD accumulator 77. In this arrangement, the engagement control of the THIRD speed clutch 13 is controlled by the control pressure form the third linear solenoid valve 88.

Now, a description is given of the FOURTH mode, which is set for the engagement of the FOURTH speed clutch 14. In this mode, the first and third on/off solenoid valves 81 and 83 are turned on and are opened while the second and fourth on/off solenoid valves 82 and 84 are turned off and are closed. The fifth on/off solenoid valve 85 is turned on or off depending upon the condition of the lock-up clutch actuation control as described above. In this condition, the spool 60*a* of the first shift valve 60 is shifted leftward, the spool 62*a* of the second shift valve 62 is shifted rightward, the spool 64*a* of the third shift valve 64 is shifted leftward, and the spool 66*a* of the fourth shift valve 66 is shifted leftward.

Also, in this mode, as the fourth on/off solenoid valve 84 is turned off, the spool 58*a* of the D inhibitor valve 58 is retained on the right side thereof. As a result, the line pressure PL is supplied to the right side oil chamber 73 of the forward/reverse selection hydraulic servomechanism 70, so the dog clutch 16 is retained at the D range position. Here, the supply of the line pressure to the right side oil chamber 73 is also detected by the hydraulic switch 93. The line pressure PL is also supplied through the oil passage 138 to the second and third linear solenoid valves 87 and 88.

In this mode, the engagement of the FOURTH speed clutch 14 is controlled by the control pressure supplied from the second linear solenoid valve 87 to the oil passage 140, which is connected with the oil passage 113 through the third shift valve 64. This oil passage 113 is connected with the oil passage 114 through the second shift valve 62, and this oil passage 114 is then connected to the FOURTH speed clutch 14 and to the FOURTH accumulator 78. In this arrangement, the engagement of the FOURTH speed clutch 14 is controlled by the control pressure from the second linear solenoid valve 87.

Now, a description is made of the 4-5 mode, which is set to shift the speed ratio of the transmission between the fourth and FIFTH speed ratios, i.e., to control the transition of speed ratio change. In this mode, the first on/off solenoid valve 81 is turned on and is opened while the second~fourth on/off solenoid valves 82, 83 and 84 are turned off and are closed. The fifth on/off solenoid valve 85 is used in the lock-up clutch actuation control. In the 4-5 mode, the spool 60*a* of the first shift valve 60 is shifted leftward, the spool 62*a* of the second shift valve 62 is shifted rightward, the spool 64*a* of the third shift valve 64 is shifted rightward, and the spool 66*a* of the fourth shift valve 66 is shifted leftward.

Also in this mode, as the fourth on/off solenoid valve 84 is turned off, the spool 58*a* of the D inhibitor valve 58 is retained on the right side thereof. In this condition, the line pressure PL is supplied to the right side oil chamber 73 of the forward/reverse selection hydraulic servomechanism 70, so the dog clutch 16 is retained at the D range position. Here, the supply of the line pressure to the right side oil chamber 73 is also detected by the hydraulic switch 93. Furthermore, the line pressure PL is supplied through the oil passage 138 to the second and third linear solenoid valves 87 and 88.

In this mode, the engagement of the FOURTH speed clutch 14 and of the FIFTH speed clutch 15 is controlled in correspondence to the actuation of the second and third linear solenoid valves 87 and 88, respectively, to change the speed ratio of the transmission smoothly.

The control pressure from the second linear solenoid valve 87 is led to the oil passage 140. This oil passage 140 is connected with the oil passage 113 through the third shift valve 64, and this oil passage 113 is connected through the second shift valve 62 with the oil passage 114, which is connected to the FOURTH speed clutch 14 and to the FOURTH accumulator 78. In this arrangement, the engagement of the FOURTH speed clutch 14 is controlled by the control pressure from the second linear solenoid valve 87.

On the other hand, the control pressure from the third linear solenoid valve 88 is led to the oil passage 142, which is connected with another oil passage 170 through first shift valve 60. This oil passage 170 is then connected through the third shift valve 64 with another oil passage 171, which is connected to the FIFTH speed clutch 15 and to the FIFTH accumulator 79. In this arrangement, the engagement of the FIFTH speed clutch 15 is controlled by the control pressure from the third linear solenoid valve 88.

Now, a description is made of the FIFTH mode, which is set for the engagement of the FIFTH speed clutch 15. In this mode, the first and second on/off solenoid valves 81 and 82 are turned on and are opened while the third and fourth on/off solenoid valves 83 and 84 are turned off and are closed. The fifth on/off solenoid valve 85 is turned on or off depending upon the condition of the lock-up clutch actuation control as described above. In this condition, the spool 60a of the first shift valve 60 is shifted leftward, the spool 62a of the second shift valve 62 is shifted leftward, the spool 64a of the third shift valve 64 is shifted rightward, and the spool 66a of the fourth shift valve 66 is shifted leftward.

Also, in this mode, as the fourth on/off solenoid valve 84 is turned off, the spool 58a of the D inhibitor valve 58 is retained on the right side thereof. As a result, the line pressure PL is supplied to the right side oil chamber 73 of the forward/reverse selection hydraulic servomechanism 70, so the dog clutch 16 is retained at the D range position. Here, the supply of the line pressure to the right side oil chamber 73 is also detected by the hydraulic switch 93. The line pressure PL is also supplied through the oil passage 138 to the second and third linear solenoid valves 87 and 88.

In this mode, the engagement of the FIFTH speed clutch 15 is controlled by the control pressure supplied from the third linear solenoid valve 88 to the oil passage 142, which is connected with the oil passage 170 through the first shift valve 60. This oil passage 170 is connected through the third shift valve 64 with the oil passage 171, which is connected to the FIFTH speed clutch 15 and to the FIFTH accumulator 79. In this arrangement, the engagement of the FIFTH speed clutch 15 is controlled by the control pressure from the third linear solenoid valve 88.

As described above, each mode is established by controlling the turning on and off of the first~fifth on/off solenoid valves 81~85 as listed in Table 1. The alphabets on the left side of Table 1, "R", "N" and "D", represent the reverse drive range, the neutral range and the forward drive range, respectively, which are switched one after another in correspondence to the manipulation of the shift lever at the driver's seat. For example, in a case where the shift lever is manipulated to shift the range setting of the transmission from the R range through the N range to the D range, at first, the Second NEUTRAL mode is set as the N range. In this N range condition, the rod 71 of the forward/reverse selection hydraulic servomechanism 70 is retained at the R range position without any force acting in the axial direction. Thereafter, when the shift lever is manipulated to the D range, the control system proceeds to set the transmission into the In-gear mode and then into the LOW mode.

On the other hand, in a case where the shift lever is manipulated to switch the range of the transmission from the D range to the N range and then from the N range to the R range, if the speed of the vehicle at the time of the switching to the N range is less than a critical speed or predetermined speed (e.g., 10 km/h), then the control system sets the Second NEUTRAL mode. When the transmission is switched into the N range, the spool 58a of the D inhibitor valve 58 is shifted from the forward drive position to the reverse drive position. As a result, the condition of the hydraulic circuit changes accordingly from the condition that the left side oil chamber 72 of the forward/reverse selection hydraulic servomechanism 70 is in fluid communication to a drain through the D inhibitor valve 58 (i.e., the condition for the D range) to the condition that the left side oil chamber 72 is now ready to receive the line pressure.

However, as mentioned previously, because the oil passage 104 which is in fluid communication to the left side oil chamber 72 through the passage 106 and the D inhibitor valve 58 is drained through the fifth shift valve 68 in the Second NEUTRAL mode, the rod 71 of the forward/reverse selection hydraulic servomechanism 70 is retained at the D range position without any force acting in the axial direction. Thereafter, when the shift lever is manipulated to the R range, the control system proceeds to set the transmission into the REVERSE mode. In this way, the forward/reverse selection hydraulic servomechanism 70 remains at the D range position while only the D inhibitor valve 58 shifts to the reverse drive position in the N range. Thereafter, the shift of the forward/reverse selection hydraulic servomechanism 70 to the R range position is controlled when the transmission is manipulated to shift into the R range. Therefore, the switching and setting of the ranges is controlled appropriately even if a solenoid valve malfunctions.

On the other hand, if the speed of the vehicle at the time of the switching to the N range is equal to or more than the critical speed (e.g., 10 km/h), then the control system sets the First NEUTRAL mode. As described above, in this mode, the rod 71 of the forward/reverse selection hydraulic servomechanism 70 is also retained at the D range position without any force acting in the axial direction. When the speed of the vehicle decreases below the critical speed, the First NEUTRAL mode is switched to the Second NEUTRAL mode. However, if the shift lever is manipulated to set the R range while the vehicle is driving still at a speed equal to or more than the critical speed, then the control system retains the First NEUTRAL mode and does not proceed to set the REVERSE mode, i.e., the control system provides the above mentioned inhibitor function. Thereafter, when the vehicle speed decreases below the critical speed, the control system proceeds to set the transmission into the REVERSE mode.

Finally, a description is made of the F/S (Fail Safe) SECOND mode. This mode is set to secure a certain driving performance by fixing the transmission to the SECOND speed ratio when the transmission experiences a breakdown. In this mode, the first~fourth on/off solenoid valves 81~84 are turned on and are opened while the fifth on/off solenoid valve 85 is turned off and is closed. In this condition, the spool 60a of the first shift valve 60 is shifted leftward, the spool 62a of the second shift valve 62 is shifted leftward, the spool 64a of the third shift valve 64 is shifted leftward, the spool 66a of the fourth shift valve 66 is shifted rightward, and the spool 68a of the fifth shift valve 68 is shifted leftward.

In this mode, the engagement of the SECOND speed clutch 12 is controlled by the control pressure supplied from the first linear solenoid valve 86 to the oil passage 107, which is connected with the oil passage 108 through the CPB valve 56. This oil passage 108 is connected with the oil passage 128 through the fifth shift valve 68, and this oil passage 128 is connected with the oil passage 129 through the third shift valve 64. This oil passage 129 is then connected with the oil passage 130 through the second shift valve 62, and this oil passage 130 is connected through the fourth shift valve 66 with the oil passage 149, which is connected to the SECOND speed clutch 12 and to the SECOND accumulator 76. In this arrangement, the engagement of the SECOND speed clutch 12 is controlled by the control pressure supplied from the first linear solenoid valve 86.

It can be understood from the above description that the engagement of the second~FIFTH speed clutches 12~15 are controlled for setting the SECOND mode and higher modes (excluding the F/S mode), respectively, by the control pressures which are supplied from the second and third linear solenoid valves 87 and 88. The primary pressures supplied to the second and third linear solenoid valves 87 and 88 are led through the forward/reverse selection hydraulic servomechanism 70. For example, if the forward/reverse selection hydraulic servomechanism 70 experiences an operational failure or if the D inhibitor valve 58 or the fourth shift valve 66, which is to control the supply of the line pressure into the right side oil chamber 73, malfunctions, then these clutches cannot be controlled systematically. However, the engagement of the SECOND speed clutch 12 in the F/S (Fail Safe) SECOND mode is controlled by the first linear solenoid valve 86, which utilizes the line pressure PL being supplied directly from the oil passage 100b bypassing the forward/reverse selection hydraulic servomechanism 70. Therefore, the SECOND speed ratio can be established regardless of any operational failure such as described above.

Figure 11:
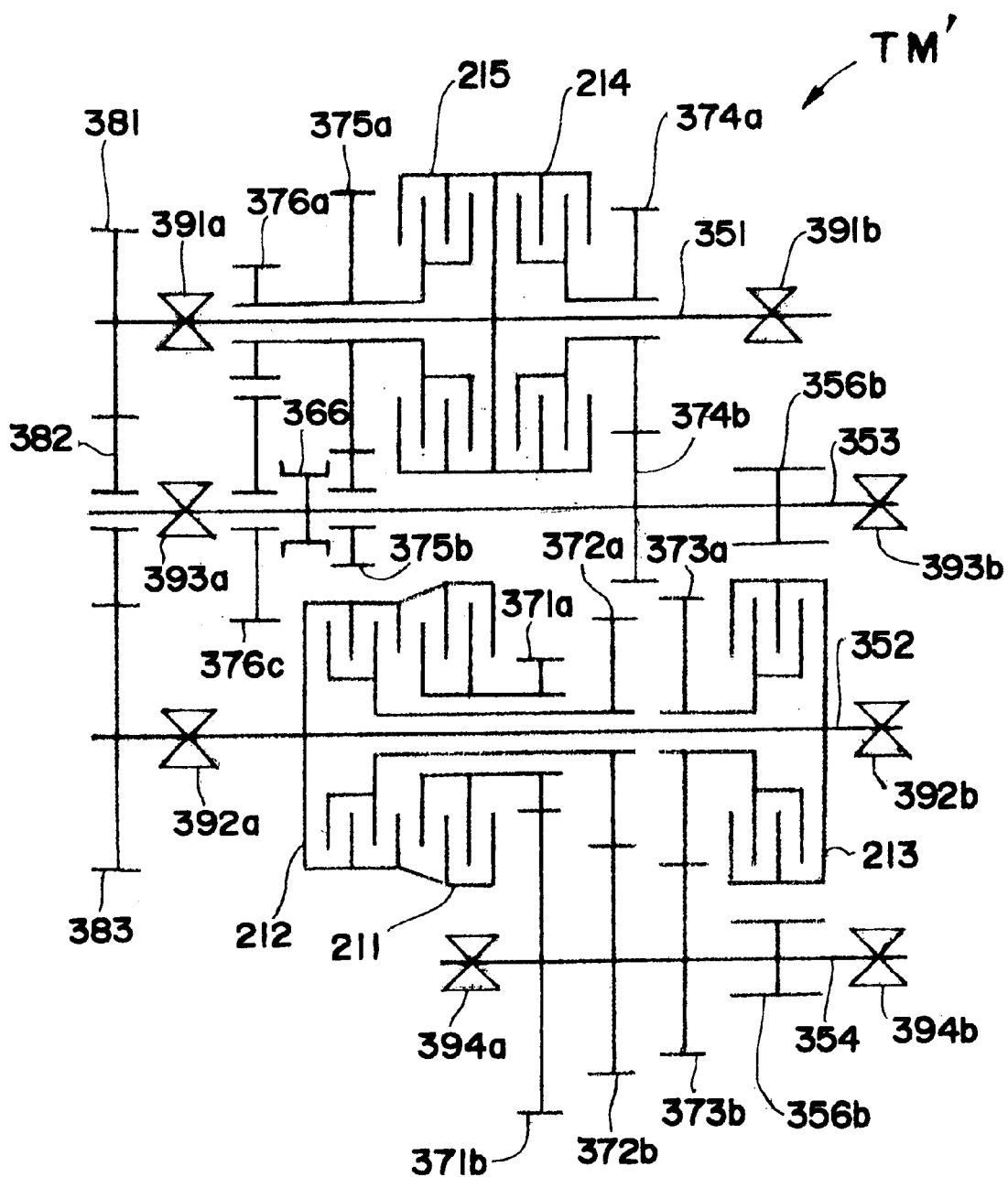
FIG. 11 is a skeleton diagram which shows schematically the power transmission system of another automatic transmission which incorporates another control system according to the present invention.
Figure 12:
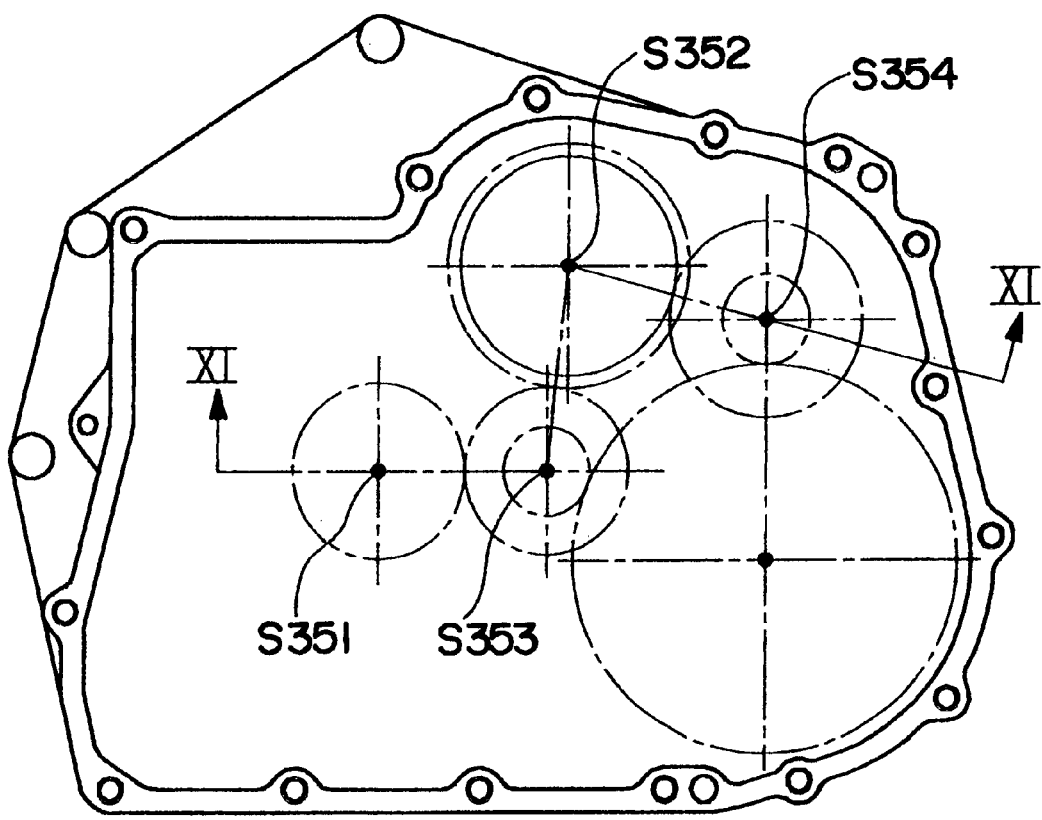
FIG. 12 is a schematic diagram showing the relative positions of the shafts of the automatic transmission shown in FIG. 11.

Now, a second embodiment of control system according to the present invention and an automatic transmission to be controlled with this system will be described with respect to FIGS. 11 and 12. In the same way as the transmission described above with reference to FIGS. 1 through 4, this automatic transmission also comprises, in a transmission housing, a torque converter TC, which is connected to the output shaft of an engine, a parallel shaft speed change mechanism TM', which is connected to the output member (or turbine) of the torque converter TC, and a differential mechanism including a last reduction driven gear, which meshes with a last reduction drive gear provided in the speed change mechanism TM'. FIGS. 11 and 12 show only the speed change mechanism TM'.

The parallel shaft speed change mechanism TM' includes a first input shaft 351, a second input shaft 352, a first countershaft 353, and a second countershaft 354, all of which are disposed parallel with one another. FIG. 11 is a schematic sectional view showing the first input shaft 351 (S351), the first countershaft 353 (S353), the second input shaft 352 (S352) and the second countershaft 354 (S354), which are taken in this order along line XI-XI in FIG. 12.

The first input shaft 351 is connected directly to the turbine of the torque converter TC and is supported rotatably by bearings 391a and 391b. The first input shaft 351 receives the drive power from the turbine and rotates with it at the same rotational speed. On this input shaft 351, from the side of the torque converter TC (i.e., the right side of the drawing), disposed are a FOURTH speed drive gear 374a, a FOURTH speed clutch 214, a FIFTH speed clutch 215, a FIFTH speed drive gear 375a, a reverse drive gear 376a and a first connection gear 381. The FOURTH speed drive gear 374a is disposed rotatably on the first input shaft 351, and the FOURTH speed clutch 214, which is actuated hydraulically, engages with the FOURTH speed drive gear 374a to connect it rotationally to the first input shaft 351. The FIFTH speed drive gear 375a and the reverse drive gear 376a, which are coupled as one body, are disposed rotatably on the first input shaft 351, and the FIFTH speed clutch 215, which is actuated hydraulically, engages with these gears to connect them rotationally to the first input shaft 351. The first connection gear 381 is mounted on the first input shaft 351, at the left end thereof outside the bearing 391a which supports the first input shaft 351 rotatably. In this condition, the first connection gear 381 and this end portion of the first input shaft 351 are supported only by this bearing 391a in cantilever.

The second input shaft 352 is also supported rotatably by bearings 392a and 392b. On this input shaft 352, from the right side of the drawing, disposed are a THIRD speed clutch 213, a THIRD speed drive gear 373a, a SECOND speed drive gear 372a, a LOW drive gear 371a, a LOW clutch 211, a SECOND speed clutch 212, and a third connection gear 383. The THIRD speed drive gear 373a, the SECOND speed drive gear 372a and the LOW drive gear 371a are each disposed rotatably on the second input shaft 352, and the THIRD speed clutch 213, the SECOND speed clutch 212, or the LOW clutch 211, which is actuated hydraulically, engages with the respective gear to connect it rotationally to the second input shaft 352. In addition, the third connection gear 383 is coupled to the second input shaft 352, at the left end thereof outside the bearing 392a which supports the second input shaft 352 rotatably. In this condition, the third connection gear 383 and this end portion of the second input shaft 352 are supported only by this bearing 392a in cantilever.

The first countershaft 353 is supported rotatably by bearings 393a and 393b. On this countershaft, from the right side of the drawing, disposed are a first last reduction drive gear 356a, a FOURTH speed driven gear 374b, a FIFTH speed driven gear 375b, a dog clutch 366, a reverse driven gear 376c and a second connection gear 382. The first last reduction drive gear 356a and the FOURTH speed driven gear 374b are fixed on and rotate together with the first countershaft 353 while the FIFTH speed driven gear 375b and the reverse driven gear 376c are each disposed rotatably on the first countershaft 353. The dog clutch 366 is actuated axially in one direction to engage with the FIFTH speed driven gear 375b so as to connect it rotationally to the first countershaft 353 or in the opposite direction to engage with the reverse driven gear 376c so as to connect it rotationally to the first countershaft 353. In addition, the second connection gear 382 is coupled to the first countershaft 353, at the left end thereof outside the bearing 393a which supports the first countershaft 353 rotatably. In this condition, the second connection gear 382 and this end portion of the first countershaft 353 are supported only by this bearing 393a in cantilever.

The second countershaft 354 is supported rotatably by bearings 394a and 394b. On this countershaft, from the right side of the drawing, disposed are a second last reduction drive gear 356b, a THIRD speed driven gear 373b, a SECOND speed driven gear 372b and a LOW driven gear 371b, all of which are fixed on the second countershaft 354.

As shown in the drawings, the LOW drive gear 371a meshes with the LOW driven gear 371b; the SECOND speed drive gear 372a meshes with the SECOND speed driven gear 372b; the THIRD speed drive gear 373a meshes with the THIRD speed driven gear 373b; the FOURTH speed drive gear 374a meshes with the FOURTH speed driven gear 374b; and the FIFTH speed drive gear 375a meshes with the FIFTH speed driven gear 375b. In addition, the reverse drive gear 376a meshes with a reverse idler gear (not shown), which then meshes with the reverse driven gear 376c. Moreover, the first connection gear 381 meshes with the second connection gear 382 which meshes with the third connection gear 383. The first and second last reduction drive gears 356a and 356b both mesh with the last reduction driven gear (which corresponds with the gear 6b shown in FIG. 1).

In this transmission, when the dog clutch 366 is engaged with the FIFTH speed driven gear 375b to connect it rotationally to the first countershaft 353, the forward drive range is established. Then, the LOW~FIFTH speed clutches 211~215 are engaged each selectively to set a respective speed ratio. For the reverse drive range, the dog clutch 366 is engaged with the reverse driven gear 376c to connect it rotationally to the first countershaft 353. Then, the FIFTH speed clutch 215 is engaged to set a reverse speed ratio. In other words, the FIFTH speed clutch 215 is used also as a reverse drive clutch.

Now, a second embodiment of control system according to the present invention is described with reference to FIGS. 13~18. This system is to control the above described automatic transmission, which comprises the LOW clutch 211, the SECOND speed clutch 212, the THIRD speed clutch 213, the FOURTH speed clutch 214, the FIFTH speed clutch 215 and a forward/reverse selection hydraulic servomechanism 270. The functions and actuations of these clutches and the servomechanism are the same as those of the clutches and the servomechanism of the transmission shown in FIGS. 1~4. FIGS. 14~18 show five sections of the hydraulic circuit of the control system at an enlarged scale, which sections are partitioned by alternate long and short dash lines A~E, respectively, in FIG. 13. The points of the oil passages shown open in the hydraulic circuit diagram are connected to a drainage system.

This hydraulic circuit includes an oil pump OP being driven by the engine to supply working oil from an oil tank OT to an oil passage 200. This oil passage 200 is connected to a main regulator valve 250, where the pressure of the oil in the oil passage 200 is adjusted to a predetermined line pressure PL. This line pressure PL is then supplied through the oil passage 200 to first~fourth on/off solenoid valves 281~284 and to second and fourth linear solenoid valves 287 and 289.

Surplus oil from the oil used for the generation of the line pressure PL at the main regulator valve 250 is led to an oil passage 201 and then to another oil passage 202. The oil flowing to the passage 201 is regulated by a lock-up shift valve 251, a lock-up control valve 252 and a torque converter check valve 253, and the oil is used for actuating and locking up the torque converter TC. After being used for the control of the torque converter TC, this oil returns through an oil cooler 254 to the oil tank OT. The oil supplied to the passage 202 is adjusted by a lubrication relief valve 255 and is used for lubricating various parts of the transmission.

Figure 13:
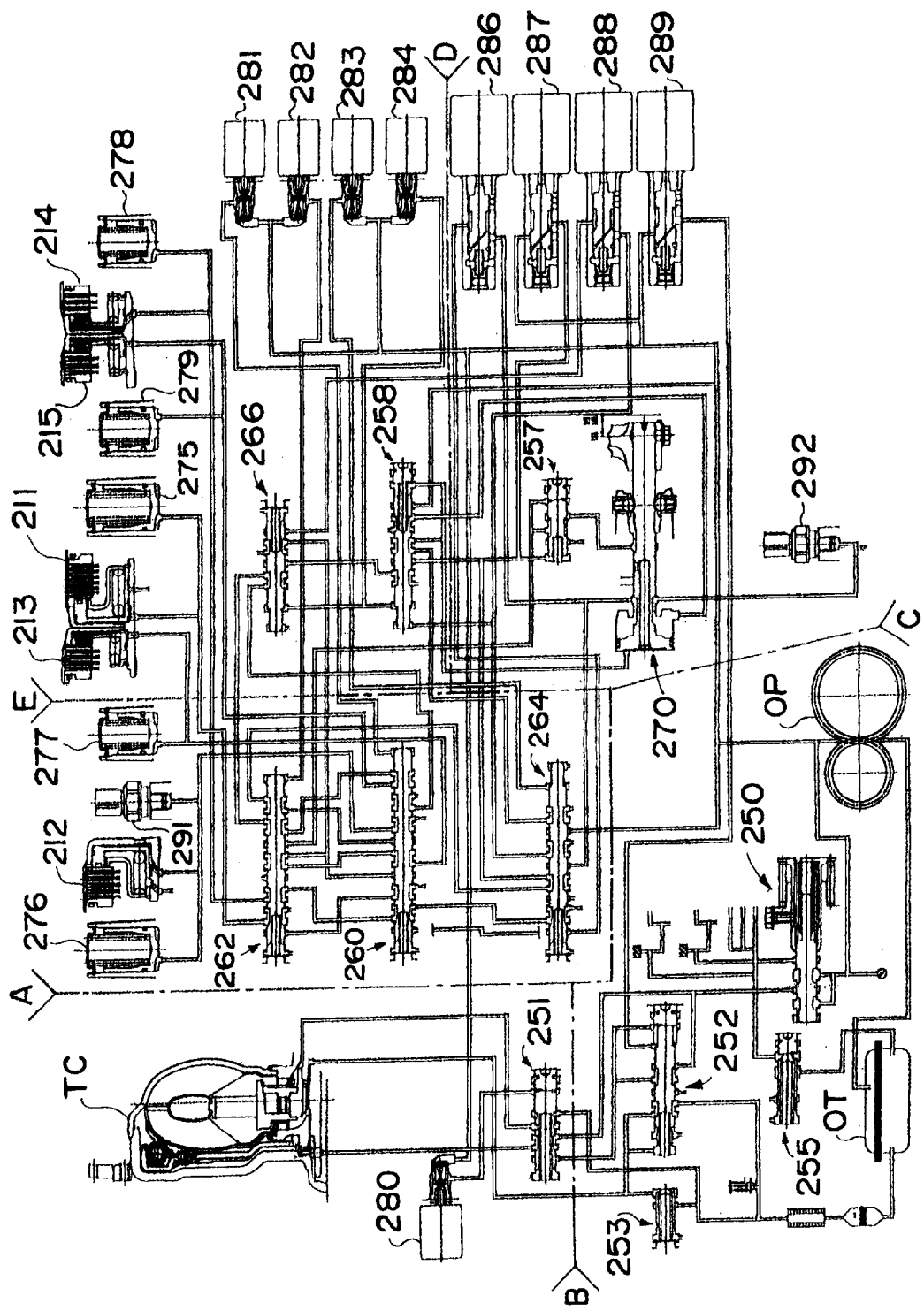
FIG. 13 is a diagram showing a hydraulic circuit which constitutes the control system used in the automatic transmission shown in FIG. 11.
Figure 14:
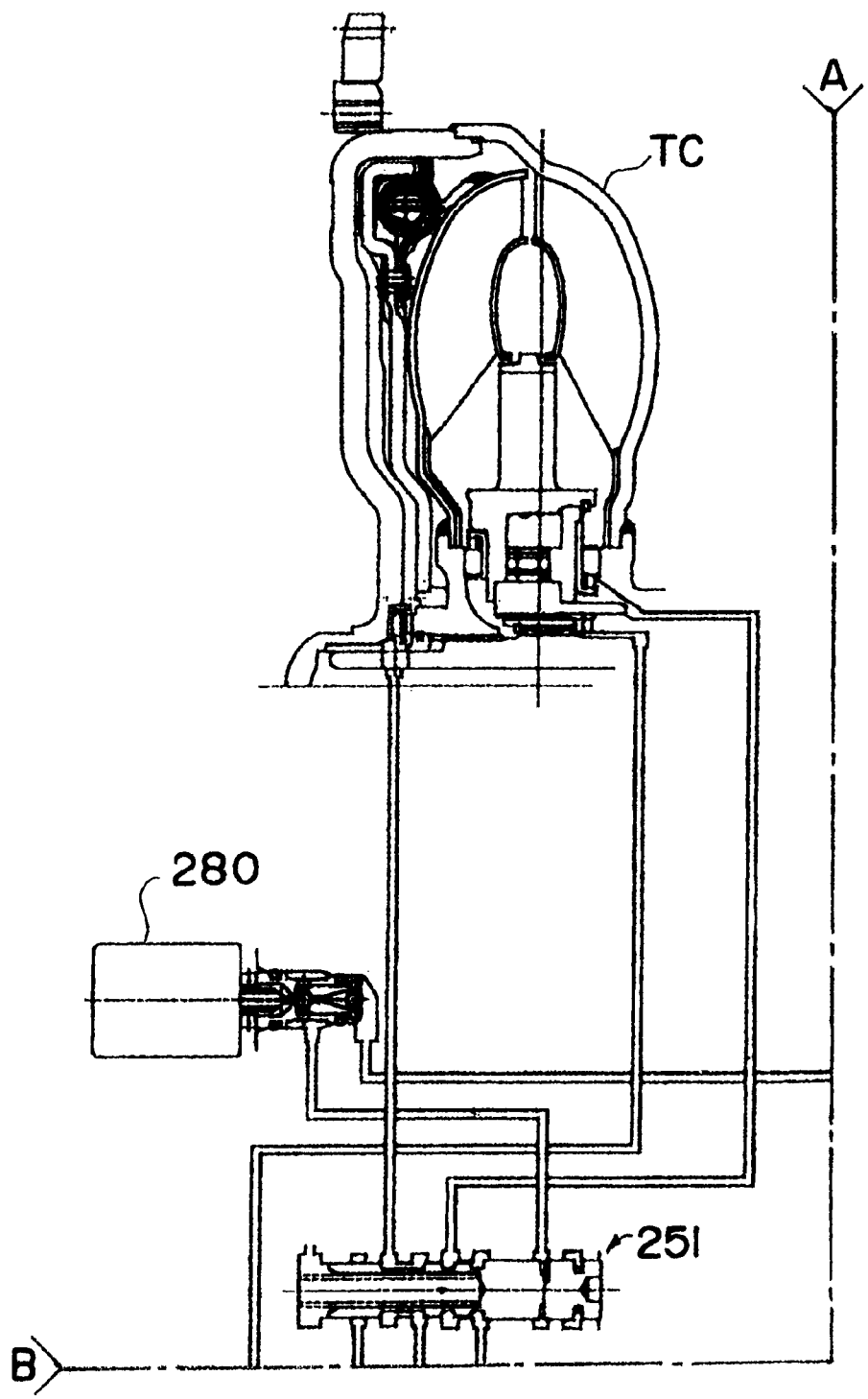
FIGS. 14–18 are diagrams, each showing part of the diagram of FIG. 13, respectively, in enlargement.
Figure 15:
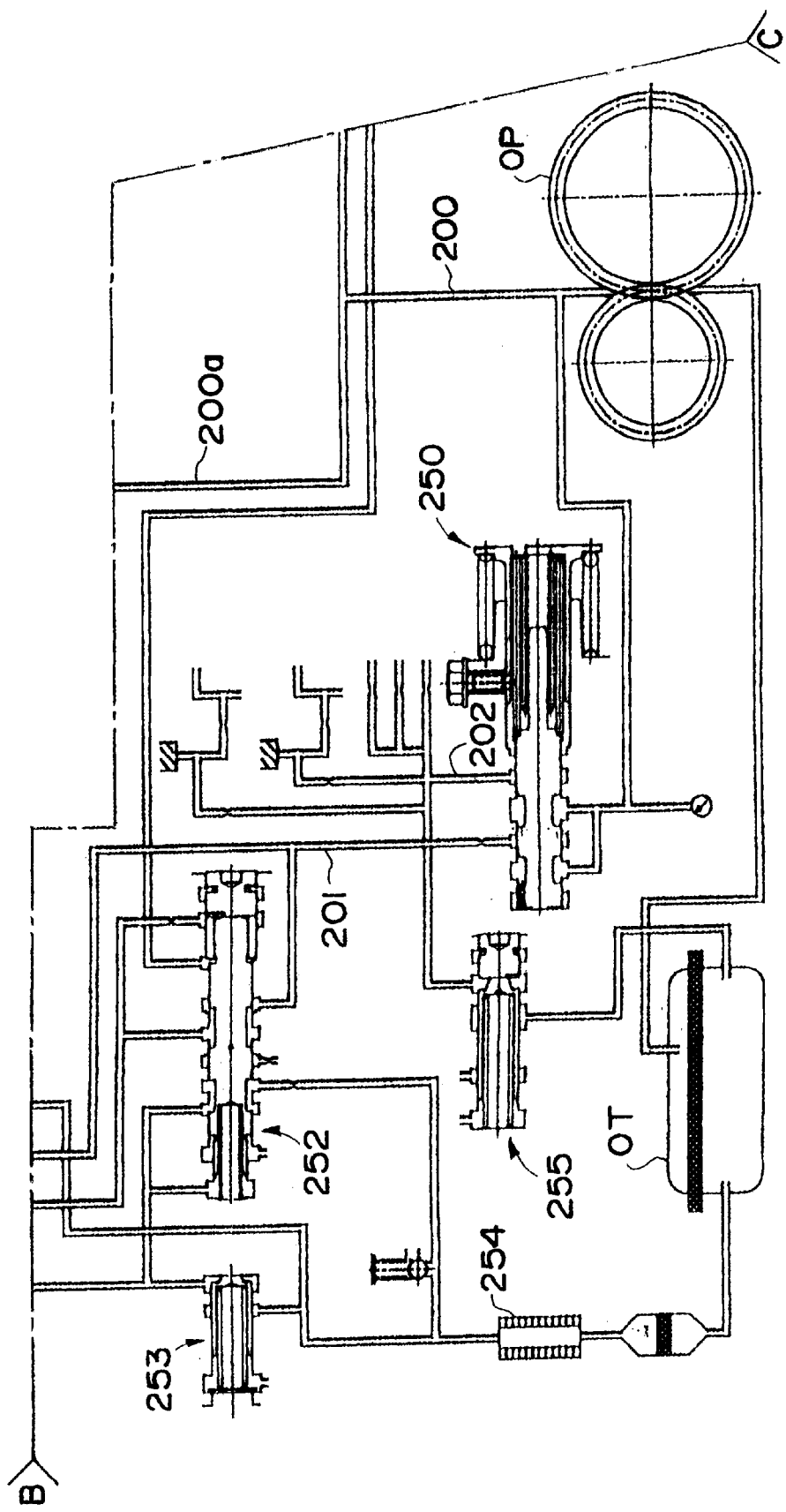
Figure 16:
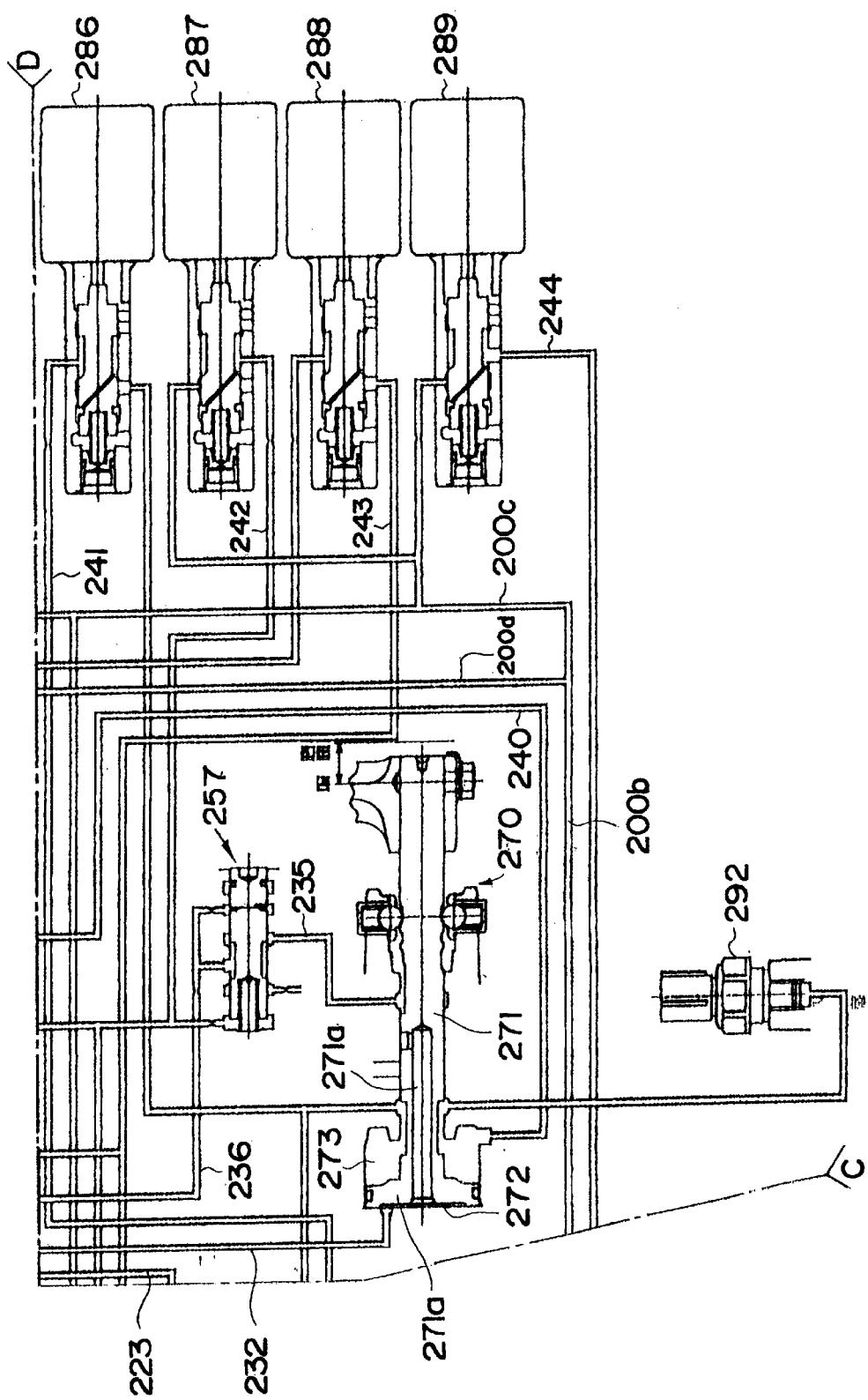
Figure 17:
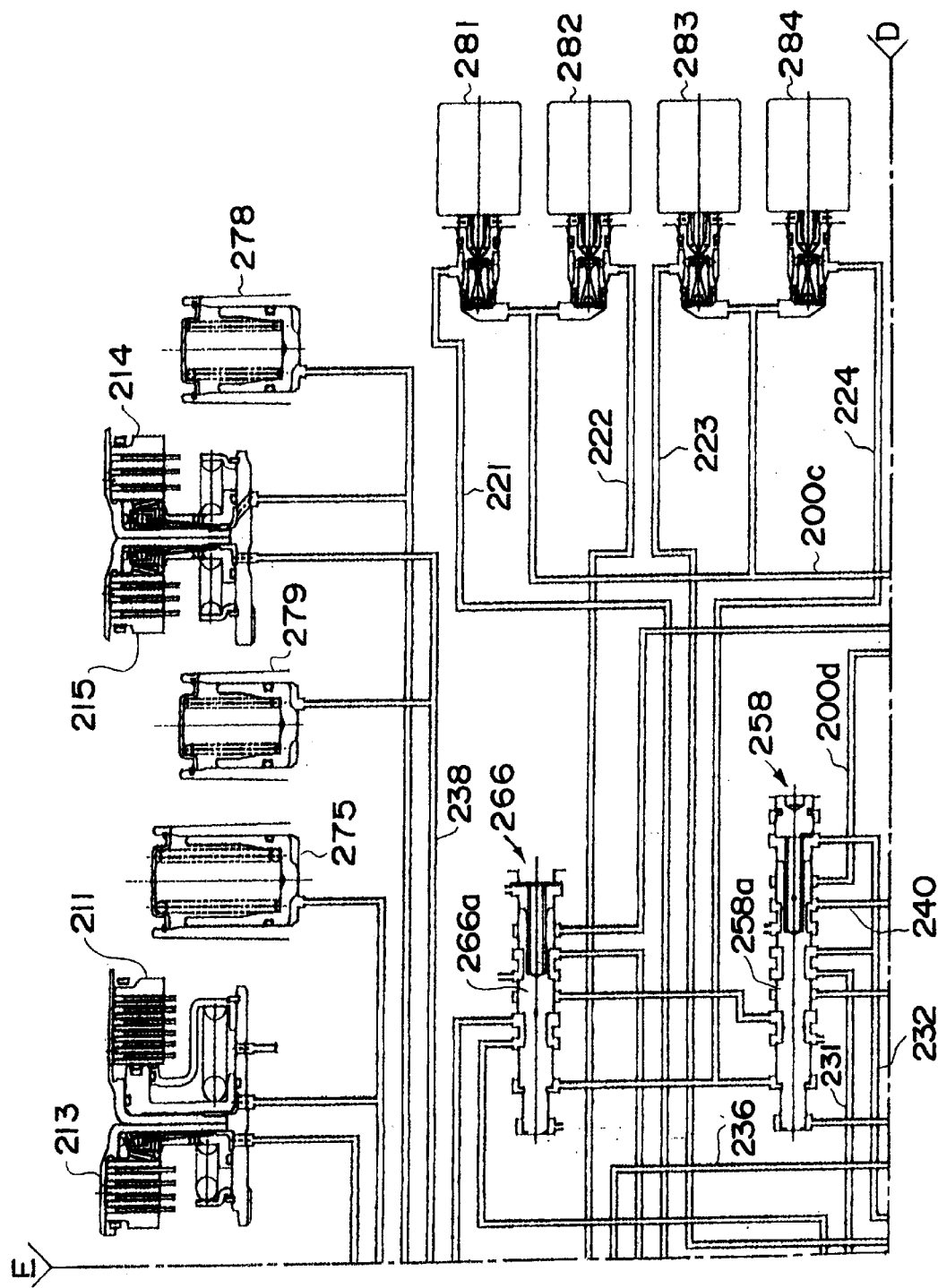
Figure 18:
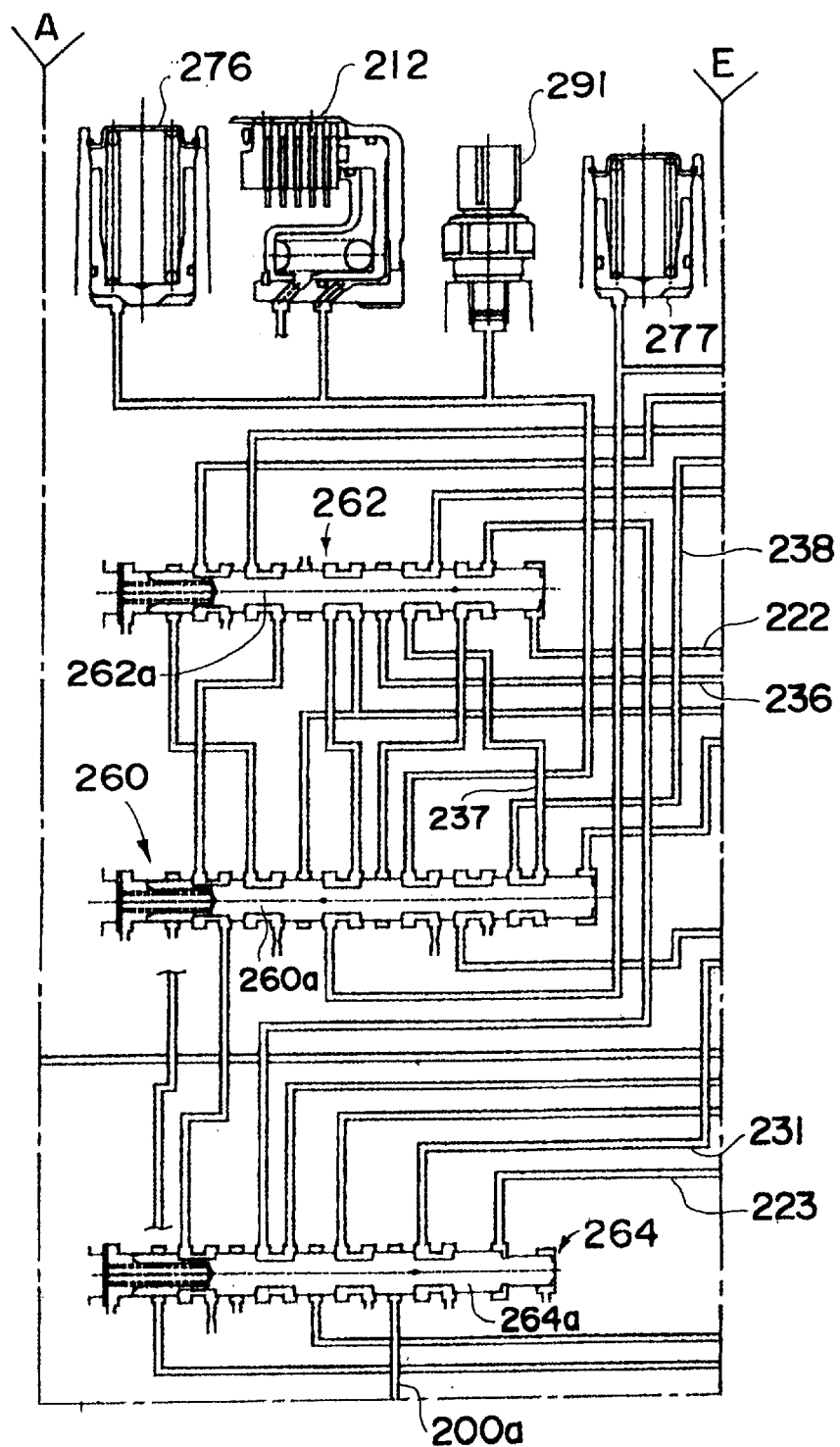

FIG. 13 shows that a LOW accumulator 275, a SECOND accumulator 276, a THIRD accumulator 277, a FOURTH accumulator 278 and a FIFTH accumulator 279 are connected through oil passages, respectively, to the LOW clutch 211, the SECOND speed clutch 212, the THIRD speed clutch 213, the FOURTH speed clutch 214 and the FIFTH speed clutch 215, which constitute the automatic transmission as described above. This hydraulic circuit is also equipped with a forward/reverse selection hydraulic servomechanism 270 to operate the dog clutch (not shown).

To control the supply of hydraulic oil to the clutches 211~215 and the forward/reverse selection hydraulic servomechanism 270, a first shift valve 260, a second shift valve 262, a third shift valve 264, a fourth shift valve 266, a reverse CPC valve 257, and a D inhibitor valve 258 are provided as shown in the figures. In turn, to control the actuation of these valves and the supply of hydraulic pressure to the clutches, first~fourth on/off solenoid valves 281~284 and first~fourth linear solenoid valves 286~289 are arranged appropriately as shown in the figures.

This control system establishes each speed ratio by actuating the first~fourth on/off solenoid valves 281~284 as listed in Table 2 below. The first~fourth on/off solenoid valves 281~284 are normally closed valves, so each valve opens when its solenoid is electrically energized (i.e., while it is turned ON).

TABLE 2

|   | Solenoid valves | | | | Mode |
|---|---|---|---|---|---|
|   | 281 | 282 | 283 | 284 | |
| R | X | O | O | X | REVERSE |
| N | X | O | O | O | First NEUTRAL |
|   | X | O | X | X | Second NEUTRAL |
| D | O | X | X | X | Second In-gear |
|   | O | O | O | X | LOW |
|   | O | O | O | O | 1-2-3 |
|   | O | O | X | O | SECOND |
|   | O | X | O | O | THIRD |
|   | X | X | O | O | 3-4-5 |
|   | X | X | O | X | FOURTH |
|   | X | X | X | O | FIFITH |

By turning on and off the first~fourth on/off solenoid valves 281~284 as listed in Table 2, the above listed modes are set as follows: the REVERSE mode is set for the reverse drive range; the First NEUTRAL mode and the second NEUTRAL mode are set for the neutral range; and the Second In-gear mode, the LOW mode, the 1-2-3 mode, the SECOND mode, the THIRD mode, the 3-4-5 mode, the FOURTH mode and the FIFTH mode are set for the D range. These modes are established in the following ways.

At first, a description is given for the establishment of the reverse speed ratio. As shown in Table 2, the first and fourth on/off solenoid valves 281 and 284 are turned off and are closed while the second and third on/off solenoid valves 282 and 283 are turned on and are opened. In this condition, the line pressure PL which is supplied to the second and third on/off solenoid valves 282 and 283 through an oil passage 200c branching from another oil passage 200b is supplied to other oil passages 222 and 223. The line pressure PL in the passage 222 acts on the right end portion of the second shift valve 262 and shifts the spool 262a of the valve leftward (this action results in a condition opposite to that shown in the figure). The line pressure PL in the passage 223 acts on the right shoulder portion of the third shift valve 264 and shifts the spool 264a of the valve leftward (this results in a condition opposite to that shown in the figure).

As a result, the line pressure PL being supplied to the third shift valve 264 through an oil passage 200a branching from another oil passage 200 is supplied through a groove provided on the spool 264a of the third shift valve 264 to another oil passage 232, which leads the pressure through the D inhibitor valve 258 to another oil passage 233. In this condition, the line pressure PL acts on the left end of the D inhibitor valve 258, so the spool 258a of this valve is shifted and maintained leftward (the position of the spool 258a in this condition is referred to as "reverse drive position"). Because the oil passage 233 is connected to the left side oil chamber 272 of the forward/reverse selection hydraulic servomechanism 270, the line pressure PL being supplied into the left side oil chamber 272 pushes rightward the piston portion 271a of a rod 271 which is provided in the forward/reverse selection hydraulic servomechanism 270 while the right side oil chamber 273 of the forward/reverse selection hydraulic servomechanism 270 is drained through an oil passage 240 and the D inhibitor valve 258. When the rod 271, which is provided with a shift fork to operate the dog clutch 366, is shifted rightward, the dog clutch 366 engages with the reverse driven gear 376c to connect it rotationally to the countershaft 353.

As mentioned previously, the reverse speed ratio is established when the dog clutch 366 is engaged with the reverse driven gear 376c and the FIFTH speed clutch 215 is engaged. More specifically, in the forward/reverse selection hydraulic servomechanism 270, whose rod 271 is shifted rightward as described above, the line pressure PL is supplied from the left side oil chamber 272 through a bore inside the rod 271 to an oil passage 235 and then through the reverse CPC valve 257 to another oil passage 236 which is in fluid communication with another oil passage 237 through the second shift valve 262, whose spool 262a is shifted leftward. Furthermore, the line pressure PL is supplied from this oil passage 237 through the first shift valve 260 to an oil passage 238 which leads to the FIFTH speed clutch 215. As a result, the FIFTH speed clutch 215 is engaged to set the reverse speed ratio.

Now, the control for establishing the neutral range is described. As shown in Table 2, the neutral range comprises the First and Second NEUTRAL modes. The First NEUTRAL mode takes place when the N range or the R range is selected while the vehicle is driving at a speed greater than a predetermined speed (e.g., 10 km/h) in the D range. The First NEUTRAL mode functions as a reverse inhibitor to prevent the transmission from shifting to the reverse speed ratio. The Second NEUTRAL mode takes place when the transmission shifts from the R range to the N range and from the D range to the N range.

Moreover, when the transmission shifts from the R range through the Second NEUTRAL mode to the D range, the transmission goes through the Second In-gear mode, the SECOND mode, the 1-2-3 mode to the LOW mode. On the other hand, if the transmission, after having shifted from the R range to the Second NEUTRAL mode, is operated to shift from the Second NEUTRAL mode to the R range, the transmission shifts directly to the R range.

Firstly, a description is given of the First NEUTRAL mode, in which only the first on/off solenoid valve 281 is turned off and is closed while the second~fourth on/off solenoid valves 282~284 are turned on and are opened. As a result, the line pressure is supplied to an oil passage 224 through the fourth on/off solenoid valve 284, which is now opened after having been closed for setting the reverse speed ratio. This pressure in the passage 224 acts on the spool 266a of the fourth shift valve 266 and on the spool 258a of the D inhibitor valve 258 and pushes them rightward. This condition of the D inhibitor valve 258, whose spool 258a is shifted rightward, is hereinafter referred to as "forward drive position". As a result, the oil passage 232 which is connected to the left side oil chamber 272 of the forward/reverse selection hydraulic servomechanism 270 is now connected to a drain through the D inhibitor valve 258, so the hydraulic oil in the left side oil chamber 272 is drained.

In the condition where the spool 258a of the D inhibitor valve 258 is shifted rightward, the line pressure PL in an oil passage 200d is led to the oil passage 240 which is connected to the right side oil chamber 273 of the forward/reverse selection hydraulic servomechanism 270. As a result, the rod 271 of the forward/reverse selection hydraulic servomechanism 270 is shifted leftward as shown in the figure, so the dog clutch 366 is also shifted to a D range position, engaging with the FIFTH speed driven gear 375b for connecting this driven gear rotationally to the first countershaft 353. In this arrangement, there is no possibility that the reverse speed ratio be established in the First NEUTRAL mode even if the FIFTH speed clutch 215 is engaged.

In the First NEUTRAL mode, the FIFTH speed clutch 215 is released to establish a neutral condition. Specifically, the oil passage 238 connected to the FIFTH speed clutch 215 is now in fluid communication through the first shift valve 260 with the oil passage 237 which is connected with the oil passage 236 through the second shift valve 262. This oil passage 236 is then connected through the reverse CPC valve 257 with the oil passage 235 which is drained through the forward/reverse selection hydraulic servomechanism 270. As a result, the FIFTH speed clutch 215 is released to set the neutral condition while the dog clutch 366 is maintained at the D range position by the forward/reverse selection hydraulic servomechanism 270.

In the Second NEUTRAL mode, the second on/off solenoid valve 282 is turned on and is opened while the first, third and fourth on/off solenoid valves 281, 283 and 284 are turned off and are closed. As described above in response to this actuation of the solenoid valves, the shift valves are set as follows: the spool 260a of the first shift valve 260 is shifted rightward, the spool 262a of the second shift valve 262 is shifted leftward, the spool 264a of the third shift valve 264 is shifted rightward, and the spool 266a of the fourth shift valve 266 is shifted leftward.

In this condition, there is no hydraulic pressure to act on the spool 258a of the D inhibitor valve 258, so the spool 258a is maintained leftward at the reverse drive position by a spring. Therefore, the oil passage 240 connected to the right side oil chamber 273 of the forward/reverse selection hydraulic servomechanism 270 is drained at the D inhibitor valve 258. On the other hand, the passage 232 connected to the left side oil chamber 272 of the forward/reverse selection hydraulic servomechanism 270 is now connected through the D inhibitor valve 258 with an oil passage 231 which is connected through the third shift valve 264 to a drain. As a result, without any axially acting force, the rod 271 of the forward/reverse selection hydraulic servomechanism 270 remains in the same condition which has existed before the transmission takes this Second NEUTRAL mode.

Now, each mode for the forward drive range (D range) is described. Firstly, a description is given of the SECOND In-gear mode. The SECOND In-gear mode takes place, for example, when the shift lever is manipulated from the N position to the D position to engage gears. In such a condition, this mode prepares the transmission to start the engagement of the LOW clutch 211. In this mode, the first on/off solenoid valve 281 is turned on and is opened while the second, third and fourth on/off solenoid valves 282, 283 and 284 are turned off and are closed. In response to this actuation of the solenoid valves, the shift valves are set as follows: the spool 260a of the first shift valve 260 is shifted leftward, the spool 262a of the second shift valve 262 is shifted rightward, the spool 264a of the third shift valve 264 is shifted rightward, and the spool 266a of the fourth shift valve 266 is shifted leftward.

In the SECOND In-gear mode, the pressure generated at a second linear solenoid valve 287 is supplied through an oil passage 242 to the SECOND speed clutch 212 to control the engagement actuation of this clutch. At this point, both the left and right side oil chambers 272 and 273 of the forward/reverse selection hydraulic servomechanism 270 are drained, and there is no force axially acting on the rod 271 thereof. As a result, the rod 271 of the forward/reverse selection hydraulic servomechanism 270 remains in the condition which has existed before the transmission takes this mode.

Now, a description is given of the LOW mode, which is set, for example, to start the vehicle when the D range is selected. In the LOW mode, the first~third on/off solenoid valves 281~283 are turned on and are opened while the fourth on/off solenoid valve 284 is turned off and is closed. In this condition, the spool 260a of the first shift valve 260 is shifted leftward, the spool 262a of the second shift valve 262 is shifted leftward, the spool 264a of the third shift valve 264 is shifted leftward, and the spool 266a of the fourth shift valve 266 is shifted leftward.

In this mode, the left side oil chamber 272 of the forward/reverse selection hydraulic servomechanism 270 is drained while the right side oil chamber 273 thereof is supplied with the line pressure PL. As a result, the rod 271 of the forward/reverse selection hydraulic servomechanism 270 is shifted leftward to the D range position, so the dog clutch 366 engages with the FIFTH speed driven gear 375b to connect it rotationally to the first countershaft 353. At the same time, the oil passage 241 coming out from the first linear solenoid valve 286 is connected to the LOW clutch 211, so the control pressure generated at the first linear solenoid valve 286 is supplied to the LOW clutch 211 to control the engagement actuation of this clutch.

In a similar way, each mode listed in Table 2 is established by controlling the turning on and off of the on/off solenoid valves 281~284 as indicated in the table. No description of how the other modes are set will not be given here because such operations can be understood from the diagram showing the hydraulic circuit.

The alphabets on the left side of Table 2, "R", "N" and "D", represent the reverse drive range, the neutral range and the forward drive range, respectively, which are switched one after another in correspondence to the manipulation of the shift lever at the driver's seat. For example, in a case where the shift lever is manipulated to shift the range setting of the transmission from the D range to the N range and then from the N range to the R range, if the speed of the vehicle at the time of the switching to the N range is less than a critical speed (e.g., 10 km/h), then the control system sets the Second NEUTRAL mode. When the transmission is switched into the N range, the spool 258a of the D inhibitor valve 258 is shifted from the forward drive position to the reverse drive position. As a result, the condition of the hydraulic circuit changes accordingly from the condition that the left side oil chamber 272 of the forward/reverse selection hydraulic servomechanism 270 is in fluid communication to a drain through the D inhibitor valve 258 (i.e., the condition for the D range) to the condition that the left side oil chamber 272 is now ready to receive the line pressure.

However, as mentioned previously, because the left side oil chamber 272 is drained in the Second NEUTRAL mode, the rod 271 of the forward/reverse selection hydraulic servomechanism 270 is retained at the D range position without any axial force. Thereafter, when the shift lever is manipulated to the R range, the control system proceeds to set the transmission into the REVERSE mode, so that the rod 271 is shifted to the R range position. In this way, the forward/reverse selection hydraulic servomechanism 270 remains at the D range position while only the D inhibitor valve 258 shifts to the reverse drive position in the N range. Thereafter, the shift of the forward/reverse selection hydraulic servomechanism 270 to the R range position is carried out when the transmission is manipulated to shift into the R range. Therefore, the switching and setting of the ranges is controlled appropriately even in an event where a solenoid valve malfunctions.

This control system is especially advantageous because the Second NEUTRAL mode and the REVERSE mode are switchable by turning on and off the third on/off solenoid valve 283, which is clearly understandable if these modes are compared in Table 2. Specifically, when the third on/off solenoid valve 283 is turned off, the D inhibitor valve 258 is shifted to the reverse drive position. Then, the third on/off solenoid valve 283 is turned on to switch the forward/reverse selection hydraulic servomechanism 270 to the R range position. This precludes any wrong range selection even in an event where the third on/off solenoid valve 283 malfunctions.

On the other hand, if the speed of the vehicle at the time of the switching to the N range is equal to or more than the critical speed (e.g., 10 km/h), then the control system sets the First NEUTRAL mode. As described previously, in this mode, the spool 258a of the D inhibitor valve 258 is retained at the forward drive position while the rod 271 of the forward/reverse selection hydraulic servomechanism 270 is also retained at the D range position without any force acting in the axial direction thereof. When the speed of the vehicle decreases below the critical speed, the First NEUTRAL mode is switched to the Second NEUTRAL mode. However, if the shift lever is manipulated to set the R range while the vehicle is driving still at a speed equal to or more than the critical speed, then the control system retains the First NEUTRAL mode and does not proceed to set the REVERSE mode. In other words, the control system provides a reverse inhibitor function. Thereafter, when the vehicle speed decreases below the critical speed, the control system proceeds to the REVERSE mode.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A control system for an automatic transmission comprising a power transmission mechanism incorporating a plurality of power transmission paths, a plurality of hydraulically operated frictionally engaging means provided inside said power transmission mechanism for selecting said power transmission paths individually, a plurality of shift control valves for controlling supply of hydraulic oil to said hydraulically operated frictionally engaging means, a forward/reverse hydraulic servomechanism for switching and selecting either said power transmission paths assigned for a forward drive range or said power transmission paths assigned for a reverse drive range, a D inhibitor valve which is switched for controlling supply of line pressure to forward drive and reverse drive servo-oil chambers of said forward/reverse hydraulic servomechanism, and a plurality of solenoid valves for controlling actuation of said shift control valves and said D inhibitor valve; wherein:

said D inhibitor valve is switchable between a forward drive position which connects said reverse drive servo-oil chamber to a drain and a reverse drive position which allows said line pressure into said reverse drive servo-oil chamber;

said control system comprising, as neutral modes to be set when a manipulation is made to shift said transmission into a neutral range:

a first neutral mode in which said D inhibitor valve is switched to said forward drive position and said forward drive servo-oil chamber is connected to said drain through any of said shift control valves; and a second neutral mode in which said D inhibitor valve is switched to said reverse drive position and said forward drive and reverse drive servo-oil chambers are connected to said drain through any of said shift control valves.

2. The control system as set forth in claim 1, wherein:

when a manipulation is made to shift said transmission from said forward drive range through said neutral range to said reverse drive range, said control system sets said second neutral mode and then sets a reverse drive mode in which said D inhibitor valve is retained at said reverse drive position and said line pressure is supplied into said reverse drive servo-oil chamber through any of said shift control valves.

3. The control system as set forth in claim 2, wherein:

while an operation to shift said transmission from said forward drive range through said neutral range to said reverse drive range is being carried out;

said solenoid valve having been used for switching said D inhibitor valve to said reverse drive position for setting said second neutral mode is turned on or off into a state opposite to a previous state which is used for switching said D inhibitor valve to said reverse drive position, so as to supply said line pressure into said reverse drive servo-oil chamber for setting said reverse drive mode.

4. The control system as set forth in claim 1, wherein:

said first neutral mode is set when a manipulation is made to shift said transmission to said neutral range while said transmission is driving forward at a speed equal to or greater than a predetermined speed.

5. The control system as set forth in claim 4, wherein:

said power transmission paths assigned for said forward drive range are selected by said forward/reverse hydraulic servomechanism in said first neutral mode.

6. The control system as set forth in claim 1, wherein:

said second neutral mode is set when a manipulation is made to shift said transmission to said neutral range while said transmission is driving forward at a speed less than a predetermined speed.

7. The control system as set forth in claim 1, wherein:

said power transmission paths used for the drive range which has been in just before said second neutral mode is set are kept selected by said forward/reverse hydraulic servomechanism in said second neutral mode.

8. The control system as set forth in claim 1, wherein:

said power transmission paths assigned for said reverse drive range comprise a dog clutch and a hydraulic clutch in a series arrangement, said dog clutch being actuated by said forward/reverse hydraulic servomechanism; and said power transmission paths assigned for said forward drive range comprise a first power transmission path including said dog clutch and said hydraulic clutch in a series arrangement and a second power transmission path including only said hydraulic clutch, said dog clutch being actuated by said forward/reverse hydraulic servomechanism.

\* \* \* \* \*